(12) United States Patent
Bui et al.

(10) Patent No.: US 12,026,304 B2
(45) Date of Patent: Jul. 2, 2024

(54) SMART DISPLAY PANEL APPARATUS AND RELATED METHODS

(71) Applicant: Intel Corporation, Santa Clara, CA (US)

(72) Inventors: Kathy Bui, Hillsboro, OR (US); Paul Diefenbaugh, Portland, OR (US); Kristoffer Fleming, Chandler, AZ (US); Michael Rosenzweig, San Ramon, CA (US); Soethiha Soe, Beaverton, OR (US); Vishal Sinha, Portland, OR (US); Nicholas Klein, Hillsboro, OR (US); Guangxin Xu, Shanghai (CN); Stephan Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/434,603

(22) PCT Filed: Mar. 27, 2019

(86) PCT No.: PCT/CN2019/079790
§ 371 (c)(1),
(2) Date: Aug. 27, 2021

(87) PCT Pub. No.: WO2020/191643
PCT Pub. Date: Oct. 1, 2020

(65) Prior Publication Data
US 2022/0147142 A1    May 12, 2022

(51) Int. Cl.
*G09G 5/00*     (2006.01)
*G06F 1/3231*   (2019.01)
(Continued)

(52) U.S. Cl.
CPC ............ *G06F 3/013* (2013.01); *G06F 1/3231* (2013.01); *G06F 1/3265* (2013.01);
(Continued)

(58) Field of Classification Search
CPC ...... G06F 3/013; G06F 1/3231; G06F 1/3265; G06F 1/3287; G06N 20/00; G06V 40/171;
(Continued)

(56) References Cited

U.S. PATENT DOCUMENTS

| 5,173,940 A | 12/1992 | Lantz et al. |
| 5,835,083 A | 11/1998 | Nielsen |

(Continued)

FOREIGN PATENT DOCUMENTS

| CN | 102197349 | 9/2011 |
| CN | 102231255 A | 11/2011 |

(Continued)

OTHER PUBLICATIONS

International Searching Authority, "Search Report," issued in connection with International Patent Application No. PCT/CN2019/079790, mailed on Jan. 3, 2020, 4 pages.
(Continued)

*Primary Examiner* — Jennifer T Nguyen
(74) *Attorney, Agent, or Firm* — Hanley, Flight and Zimmerman, LLC

(57) ABSTRACT

Example smart panel display apparatus and related methods are disclosed herein. An example apparatus to control a display of an electronic device includes a user presence detector to determine a presence of a user relative to the device based on image data generated by an image sensor of the device. The example apparatus includes a gaze detector to determine a direction of a gaze of the user relative to the image sensor based on the image data. The example appa-
(Continued)

ratus includes a backlight manager to selectively adjust a display brightness based on the presence of the user and the direction of the gaze of the user.

24 Claims, 15 Drawing Sheets

(51) Int. Cl.

| | |
|---|---|
| *G06F 1/3234* | (2019.01) |
| *G06F 1/3287* | (2019.01) |
| *G06F 3/01* | (2006.01) |
| *G06N 20/00* | (2019.01) |
| *G06V 40/16* | (2022.01) |
| *G09G 3/20* | (2006.01) |
| *G09G 3/34* | (2006.01) |
| *H04M 1/22* | (2006.01) |

(52) U.S. Cl.
CPC ........... *G06F 1/3287* (2013.01); *G06N 20/00* (2019.01); *G06V 40/166* (2022.01); *G06V 40/171* (2022.01); *G09G 3/2092* (2013.01); *G09G 3/3406* (2013.01); *G09G 2354/00* (2013.01); *G09G 2360/144* (2013.01); *H04M 1/22* (2013.01)

(58) Field of Classification Search
CPC .. G06V 40/166; G09G 3/2092; G09G 3/3406; G09G 2354/00; G09G 2360/144; H04M 1/22
USPC ......................................................... 345/156
See application file for complete search history.

(56) References Cited

U.S. PATENT DOCUMENTS

| | | |
|---|---|---|
| 6,657,647 B1 | 12/2003 | Bright |
| 6,760,649 B2 | 7/2004 | Cohen |
| 7,386,799 B1 | 6/2008 | Clanton et al. |
| 7,559,034 B1 | 7/2009 | Paperny et al. |
| 7,725,547 B2 | 5/2010 | Albertson et al. |
| 7,971,156 B2 | 6/2011 | Albertson et al. |
| 8,139,032 B2 | 3/2012 | Su et al. |
| 8,566,696 B1 | 10/2013 | Hamon et al. |
| 8,581,974 B2 | 11/2013 | Lin et al. |
| 8,717,318 B2 | 5/2014 | Anderson et al. |
| 8,812,831 B2 | 8/2014 | Cheng et al. |
| 8,954,884 B1 | 2/2015 | Barger |
| 8,994,847 B2 | 3/2015 | Chen et al. |
| 9,268,434 B2 | 2/2016 | Sultenfuss et al. |
| 9,311,909 B2 | 4/2016 | Giaimo, III et al. |
| 9,436,241 B2 | 9/2016 | Tang et al. |
| 9,575,559 B2 | 2/2017 | Andrysco |
| 9,721,383 B1 | 8/2017 | Horowitz et al. |
| 9,740,290 B2 | 8/2017 | Rosenberg et al. |
| 9,766,700 B2 | 9/2017 | Lyons et al. |
| 9,785,234 B2 | 10/2017 | Horesh |
| 9,846,471 B1 | 12/2017 | Arora |
| 9,936,195 B2 | 4/2018 | Horesh |
| 9,996,638 B1 | 6/2018 | Holz et al. |
| 10,027,662 B1 | 7/2018 | Mutagi et al. |
| 10,101,817 B2 | 10/2018 | Hsin et al. |
| 10,234,928 B2 | 3/2019 | Chen |
| 10,254,178 B2 | 4/2019 | Carbone et al. |
| 10,262,599 B2 | 4/2019 | Lang et al. |
| 10,304,209 B2 | 5/2019 | Alonso |
| 10,415,286 B1 | 9/2019 | Porcella et al. |
| 10,551,888 B1 | 2/2020 | North et al. |
| 10,620,457 B2 | 4/2020 | Ain-Kedem |
| 10,620,786 B2 | 4/2020 | Veeramani et al. |
| 10,725,510 B2 | 7/2020 | Ho et al. |
| 10,740,912 B2 | 8/2020 | Ren et al. |
| 10,768,724 B1 | 9/2020 | Han |
| 10,819,920 B1 | 10/2020 | Hamlin et al. |
| 10,884,479 B2 | 1/2021 | Chen |
| 11,153,472 B2 | 10/2021 | Konicek |
| 11,194,398 B2 | 12/2021 | Bernhart |
| 11,360,528 B2 | 6/2022 | Mishra et al. |
| 11,379,016 B2 | 7/2022 | Cooper et al. |
| 11,543,873 B2 | 1/2023 | Sengupta et al. |
| 11,733,761 B2 | 8/2023 | Sinha et al. |
| 11,782,488 B2 | 10/2023 | Cooper et al. |
| 11,809,535 B2 | 11/2023 | Magi et al. |
| 2002/0089190 A1 | 7/2002 | Wang et al. |
| 2002/0091738 A1 | 7/2002 | Rohrabaugh et al. |
| 2003/0043174 A1 | 3/2003 | Hinckley et al. |
| 2003/0174149 A1 | 9/2003 | Fujisaki et al. |
| 2004/0158739 A1 | 8/2004 | Wakai et al. |
| 2004/0175020 A1 | 9/2004 | Bradski et al. |
| 2004/0252101 A1 | 12/2004 | Wilk |
| 2005/0071698 A1 | 3/2005 | Kangas |
| 2006/0146030 A1 | 7/2006 | Kim |
| 2006/0192775 A1 | 8/2006 | Nicholson et al. |
| 2007/0228138 A1 | 10/2007 | Huang et al. |
| 2008/0046425 A1 | 2/2008 | Perski |
| 2008/0112571 A1 | 5/2008 | Bradicich et al. |
| 2008/0158144 A1 | 7/2008 | Schobben et al. |
| 2008/0301300 A1 | 12/2008 | Toub |
| 2009/0092293 A1 | 4/2009 | Lin |
| 2009/0165125 A1 | 6/2009 | Brown et al. |
| 2010/0039376 A1 | 2/2010 | Wang |
| 2010/0079508 A1 | 4/2010 | Hodge et al. |
| 2010/0100716 A1 | 4/2010 | Scott |
| 2010/0281432 A1 | 11/2010 | Geisner et al. |
| 2010/0295839 A1 | 11/2010 | Nagaya |
| 2011/0055752 A1 | 3/2011 | Rubinstein et al. |
| 2011/0154266 A1 | 6/2011 | Friend et al. |
| 2011/0175932 A1 | 7/2011 | Yu et al. |
| 2011/0248918 A1 | 10/2011 | Yoo et al. |
| 2011/0251733 A1 | 10/2011 | Atkinson |
| 2011/0252339 A1 | 10/2011 | Lemonik et al. |
| 2011/0273546 A1 | 11/2011 | Lin et al. |
| 2011/0296163 A1 | 12/2011 | Abernethy et al. |
| 2011/0298702 A1 | 12/2011 | Sakata et al. |
| 2011/0298967 A1 | 12/2011 | Clavin et al. |
| 2012/0032894 A1 | 2/2012 | Parivar et al. |
| 2012/0054670 A1 | 3/2012 | Rainisto |
| 2012/0062470 A1 | 3/2012 | Chang |
| 2012/0123680 A1 | 5/2012 | Wipplinger et al. |
| 2012/0171656 A1 | 7/2012 | Shen |
| 2012/0172085 A1 | 7/2012 | Vuppu et al. |
| 2012/0249429 A1 | 10/2012 | Anderson et al. |
| 2012/0268893 A1 | 10/2012 | Yin |
| 2012/0300061 A1 | 11/2012 | Osman et al. |
| 2012/0319997 A1 | 12/2012 | Majumder |
| 2013/0007096 A1 | 1/2013 | Pahlavan et al. |
| 2013/0007590 A1 | 1/2013 | Rivera et al. |
| 2013/0021750 A1 | 1/2013 | Senatori |
| 2013/0080807 A1 | 3/2013 | Theocharous et al. |
| 2013/0120460 A1 | 5/2013 | Adams et al. |
| 2013/0158999 A1 | 6/2013 | Maruta et al. |
| 2013/0173946 A1 | 7/2013 | Rotem et al. |
| 2013/0174016 A1 | 7/2013 | Glazer et al. |
| 2013/0185633 A1 | 7/2013 | Bunker et al. |
| 2013/0207895 A1 | 8/2013 | Lee et al. |
| 2013/0212462 A1 | 8/2013 | Athas et al. |
| 2013/0222329 A1 | 8/2013 | Larsby et al. |
| 2013/0283213 A1 | 10/2013 | Guendelman et al. |
| 2013/0289792 A1 | 10/2013 | Cheng et al. |
| 2013/0321265 A1 | 12/2013 | Bychkov et al. |
| 2013/0321271 A1 | 12/2013 | Bychkov et al. |
| 2013/0332760 A1 | 12/2013 | Reece et al. |
| 2014/0006830 A1 | 1/2014 | Kamhi et al. |
| 2014/0028548 A1 | 1/2014 | Bychkov et al. |
| 2014/0050360 A1 | 2/2014 | Lin et al. |
| 2014/0085451 A1 | 3/2014 | Kamimura et al. |
| 2014/0089865 A1 | 3/2014 | Gay et al. |
| 2014/0129937 A1 | 5/2014 | Jarvinen et al. |
| 2014/0132508 A1* | 5/2014 | Hodge ................. G06F 1/3265 345/156 |
| 2014/0139456 A1 | 5/2014 | Wigdor et al. |
| 2014/0149935 A1 | 5/2014 | Johnson et al. |

(56) References Cited

U.S. PATENT DOCUMENTS

| | | |
|---|---|---|
| 2014/0189579 A1 | 7/2014 | Rimon et al. |
| 2014/0191995 A1 | 7/2014 | Karpin et al. |
| 2014/0201690 A1 | 7/2014 | Holz |
| 2014/0208260 A1 | 7/2014 | Kawahara et al. |
| 2014/0258942 A1 | 9/2014 | Kutliroff et al. |
| 2014/0267021 A1 | 9/2014 | Lee et al. |
| 2014/0267034 A1 | 9/2014 | Krulce |
| 2014/0281918 A1 | 9/2014 | Wei et al. |
| 2014/0313120 A1 | 10/2014 | Kamhi |
| 2014/0344599 A1 | 11/2014 | Branover |
| 2014/0361977 A1 | 12/2014 | Stafford et al. |
| 2014/0372511 A1 | 12/2014 | Kapadia et al. |
| 2014/0379340 A1 | 12/2014 | Timem |
| 2014/0380075 A1 | 12/2014 | Pulapaka et al. |
| 2015/0009238 A1 | 1/2015 | Kudalkar |
| 2015/0015688 A1 | 1/2015 | Yang |
| 2015/0042572 A1 | 2/2015 | Lombardi et al. |
| 2015/0058649 A1 | 2/2015 | Song et al. |
| 2015/0100884 A1 | 4/2015 | Ryu et al. |
| 2015/0121193 A1 | 4/2015 | Beveridge et al. |
| 2015/0121287 A1 | 4/2015 | Fermon |
| 2015/0177843 A1 | 6/2015 | Kwon |
| 2015/0185909 A1 | 7/2015 | Gecnuk |
| 2015/0193395 A1 | 7/2015 | Nicolaou et al. |
| 2015/0198991 A1 | 7/2015 | Bircher |
| 2015/0220149 A1 | 8/2015 | Plagemann et al. |
| 2015/0220150 A1 | 8/2015 | Plagemann et al. |
| 2015/0248167 A1 | 9/2015 | Turbell et al. |
| 2015/0264572 A1 | 9/2015 | Turgeman |
| 2015/0360567 A1 | 12/2015 | Sannomiya et al. |
| 2015/0363070 A1 | 12/2015 | Katz |
| 2015/0378443 A1 | 12/2015 | Luo |
| 2015/0378748 A1 | 12/2015 | Cheng |
| 2016/0034019 A1 | 2/2016 | Seo et al. |
| 2016/0055825 A1 | 2/2016 | Lee |
| 2016/0062584 A1 | 3/2016 | Cohen et al. |
| 2016/0087981 A1 | 3/2016 | Dorresteijn |
| 2016/0091938 A1 | 3/2016 | Edwards et al. |
| 2016/0109961 A1 | 4/2016 | Parshionikar |
| 2016/0116960 A1 | 4/2016 | Kwak et al. |
| 2016/0132099 A1 | 5/2016 | Grabau et al. |
| 2016/0165544 A1 | 6/2016 | Pefkianakis et al. |
| 2016/0170617 A1 | 6/2016 | Shi et al. |
| 2016/0179767 A1 | 6/2016 | Mavinakuli et al. |
| 2016/0180762 A1 | 6/2016 | Bathiche et al. |
| 2016/0187994 A1 | 6/2016 | La et al. |
| 2016/0202750 A1 | 7/2016 | Pulapaka et al. |
| 2016/0212317 A1 | 7/2016 | Alameh et al. |
| 2016/0232701 A1 | 8/2016 | Drozdyuk |
| 2016/0259467 A1 | 9/2016 | Nayyar et al. |
| 2016/0297362 A1 | 10/2016 | Tijerina et al. |
| 2016/0335989 A1 | 11/2016 | Ooi et al. |
| 2016/0370860 A1 | 12/2016 | Bychkov et al. |
| 2017/0010654 A1 | 1/2017 | Chen |
| 2017/0018234 A1* | 1/2017 | Na ................. G09G 3/3406 |
| 2017/0034146 A1 | 2/2017 | Sugaya |
| 2017/0039170 A1 | 2/2017 | Tunali et al. |
| 2017/0039480 A1 | 2/2017 | Bitran et al. |
| 2017/0045936 A1 | 2/2017 | Kakapuri |
| 2017/0085790 A1 | 3/2017 | Bohn |
| 2017/0090585 A1 | 3/2017 | Bernhart |
| 2017/0147879 A1 | 5/2017 | Alameh et al. |
| 2017/0201254 A1 | 7/2017 | Hanssen et al. |
| 2017/0219240 A1 | 8/2017 | Cassini et al. |
| 2017/0269725 A1 | 9/2017 | Kang |
| 2017/0321856 A1 | 11/2017 | Keates |
| 2018/0039410 A1 | 2/2018 | Kim et al. |
| 2018/0039990 A1 | 2/2018 | Lindemann |
| 2018/0136719 A1* | 5/2018 | Chen ................. G06F 3/013 |
| 2018/0157815 A1 | 6/2018 | Salama et al. |
| 2018/0164942 A1 | 6/2018 | Huffman et al. |
| 2018/0166076 A1 | 6/2018 | Higuchi et al. |
| 2018/0188774 A1 | 7/2018 | Ent et al. |
| 2018/0188803 A1 | 7/2018 | Sharma et al. |
| 2018/0189547 A1 | 7/2018 | Daniels et al. |
| 2018/0224871 A1 | 8/2018 | Sahu et al. |
| 2018/0321731 A1 | 11/2018 | Alfano et al. |
| 2018/0373292 A1 | 12/2018 | Perelli |
| 2019/0004764 A1 | 1/2019 | Son et al. |
| 2019/0034609 A1 | 1/2019 | Yang et al. |
| 2019/0079572 A1 | 3/2019 | Yamamoto |
| 2019/0129473 A1 | 5/2019 | Hu et al. |
| 2019/0147875 A1 | 5/2019 | Stemmer et al. |
| 2019/0155364 A1 | 5/2019 | Chen |
| 2019/0155368 A1 | 5/2019 | Branover |
| 2019/0174419 A1 | 6/2019 | Schillings et al. |
| 2019/0213309 A1 | 7/2019 | Morestin |
| 2019/0236390 A1 | 8/2019 | Guo et al. |
| 2019/0239384 A1 | 8/2019 | North et al. |
| 2019/0250691 A1 | 8/2019 | Lee et al. |
| 2019/0258785 A1 | 8/2019 | Alameh et al. |
| 2019/0265831 A1 | 8/2019 | Sinnott et al. |
| 2019/0278339 A1 | 9/2019 | Cooper et al. |
| 2019/0361501 A1 | 11/2019 | Park et al. |
| 2019/0371326 A1 | 12/2019 | Bocklet et al. |
| 2019/0371342 A1 | 12/2019 | Tukka et al. |
| 2020/0012331 A1 | 1/2020 | de Cesare et al. |
| 2020/0026342 A1 | 1/2020 | Sengupta et al. |
| 2020/0026896 A1 | 1/2020 | Debates |
| 2020/0033920 A1 | 1/2020 | Nielsen et al. |
| 2020/0092817 A1 | 3/2020 | Bai |
| 2020/0125158 A1 | 4/2020 | Giusti et al. |
| 2020/0125179 A1 | 4/2020 | Okuley |
| 2020/0133358 A1 | 4/2020 | Mishra et al. |
| 2020/0133374 A1 | 4/2020 | Sinha et al. |
| 2020/0134151 A1 | 4/2020 | Magi et al. |
| 2020/0142471 A1* | 5/2020 | Azam ................. G06F 1/3265 |
| 2020/0175944 A1* | 6/2020 | Sun ................. G06F 1/3265 |
| 2020/0213501 A1 | 7/2020 | Sohn |
| 2020/0259638 A1 | 8/2020 | Carmignani et al. |
| 2020/0348745 A1 | 11/2020 | Hamlin et al. |
| 2021/0025976 A1 | 1/2021 | Chandel et al. |
| 2021/0096237 A1 | 4/2021 | Patole et al. |
| 2021/0109585 A1 | 4/2021 | Fleming et al. |
| 2021/0240254 A1 | 8/2021 | Hamlin et al. |
| 2021/0318743 A1 | 10/2021 | Partiwala et al. |
| 2021/0327394 A1 | 10/2021 | Bui et al. |
| 2022/0060572 A1 | 2/2022 | Kwon |
| 2022/0245229 A1 | 8/2022 | Zhang |
| 2022/0350385 A1 | 11/2022 | Mishra et al. |
| 2023/0205307 A1 | 6/2023 | Han et al. |

FOREIGN PATENT DOCUMENTS

| | | |
|---|---|---|
| CN | 107077184 | 8/2017 |
| CN | 108958447 A | 12/2018 |
| CN | 112558056 A | 3/2021 |
| EP | 2518586 | 10/2012 |
| EP | 2830366 A1 | 1/2015 |
| EP | 3285133 | 2/2018 |
| JP | H0651901 A | 2/1994 |
| JP | 10-240389 A | 9/1998 |
| JP | 2001255854 A | 9/2001 |
| JP | 2002071833 A | 3/2002 |
| JP | 2005221907 A | 8/2005 |
| JP | 2010060746 A | 3/2010 |
| JP | 2010271339 A | 12/2010 |
| JP | 2011137874 A | 7/2011 |
| JP | 2016517087 A | 6/2016 |
| KR | 20130093962 A | 8/2013 |
| KR | 20150022673 | 3/2015 |
| KR | 20180029370 | 3/2018 |
| KR | 20190027930 A | 3/2019 |
| WO | 2010071631 | 6/2010 |
| WO | 2014131188 | 9/2014 |
| WO | 2014186294 | 11/2014 |
| WO | 2014205227 | 12/2014 |
| WO | 2015026203 | 2/2015 |

(56) References Cited

FOREIGN PATENT DOCUMENTS

| WO | 2020191643 | 10/2020 |
|---|---|---|
| WO | 2021258395 | 12/2021 |

OTHER PUBLICATIONS

International Searching Authority, "Written Opinion," issued in connection with International Patent Application No. PCT/CN2019/079790, mailed on Jan. 3, 2020, 4 pages.
United States Patent and Trademark Office, "Final Office Action," issued in connection with U.S. Appl. No. 16/728,899, dated Jun. 24, 2022, 10 pages.
International Searching Authority, "International Search Report", issued in connection with PCT. Application No. PCT/US2021/049649, issued on Jan. 14, 2022, 5 pages.
International Searching Authority, "Written Opinion", issued in connection with PCT. Application No. PCT/US2021/049649, issued on Jan. 14, 2022, 9 pages.
United States Patent and Trademark Office, "Final Office Action," issued in connection with U.S. Appl. No. 16/725,467, dated Aug. 18, 2022, 29 pages.
United States Patent and Trademark Office, "Notice of Allowance and Fee(s) Due," issued in connection with U.S. Appl. No. 16/586,225, dated Aug. 31, 2022, 5 pages.
United States Patent and Trademark Office, "Corrected Notice of Allowability," issued in connection with U.S. Appl. No. 16/586,225, dated Sep. 19, 2022, 2 pages.
United States Patent and Trademark Office, "Non-Final Office Action" issued in connection with U.S. Appl. No. 16/728,899, issued on Oct. 20, 2022, 9 pages.
European Patent Office, "Extended European Search Report," issued in connection with European Patent Application No. 19921860.3, dated Oct. 10, 2022, 8 pages.
"Dell's New Latitude 7400 2-in-1 Can Detect Your Presence and Automatically Wake the System," MSPowerUser, Jan. 4, 2019, available at https://mspoweruser.com/dells-new-latitude-7400-2-in-1-can-detect-your-presence-and-automatically-wake-the-system/ (20 pages).
Brian Reads, "Microsoft Windows Vista SideShow—In-Depth (pics)", Notebook Review, available at www.notebookreview.com/news/microsoft-windows-vista-sideshow-in-depth-pics/ (retrieved May 6, 2019), Jan. 11, 2006, 7 pages.
Cutress, Ian, "Asus ZenBook Pro 15(UX580): A 5.5-inch Screen in the Touchpad", retrieved from https://www.anandtech.com/show/12880/asus-zenbook-pro-15-ux580-a-55inch-screen-in-the-touchpad, Jun. 5, 2018, 5 pages.
European Patent Office, "Extended European Search Report" issued in connection with European Patent Application No. 20194494.9, issued on Feb. 17, 2021, 7 pages.
European Patent Office, "Extended European Search Report," issued in connection with European Patent Application No. 20164273.3, dated Oct. 9, 2020, 14 pages.
European Patent Office, "Extended Search Report," issued in connection with European Patent Application No. 20181123.9, dated Dec. 4, 2020, 11 pages.
Gajitz, "Open Sesame! Gesture-Controlled Motorized Laptop Lid", available at https://gajitz.com/open-sesame-gesture-controlled-motorized-laptop-lid/ (retrieved May 6, 2019), Sep. 2012, 3 pages.
Indiegogo, "Cosmo Communicator", available at https://www.indiegogo.com/projects/cosmo-communicator#/ (retrieved May 6, 2019), 2018, 18 pages.
Jack Purcher, ""Google Patents a Motorized Pixelbook Lid that Opens and Closes with a Simple Touch & Auto-Aligns the Display to the user's Face"", Patently Mobile, available at https://www.patentlymobile.com/2017/11/google-patents-a-motorized-pixelbook-lid-that-opens-and-closes-with-a-simple-touch-auto-aligns-the-display-to-the-users-fa.html (retrieved May 6, 2019), Nov. 25, 2017, 6 pages.
Kul Bushan, "CES 2019_ Dell's new laptop can sense your presence and wake itself" Hindustan Times, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 2019), Jan. 5, 2019, 8 pages.
Monica Chin, "Alexa on Windows 10 Hands-On: Useful, with 1 Big Catch", Laptop Magazine, available at https://www.laptopmag.com/articles/alexa-windows-10-hands-on (retrieved May 6, 2019), Nov. 14, 2018, 6 pages.
Notebook Review, "CES 2007: Vista SideShow in HP, Fujitsu, LG and Asus Notebooks," Notebook Review, available at www.notebookreview.com/news/ces-2007-vista-sideshow-in-hp-fujitsu-lg-and-asus-notebooks/ (retrieved May 6, 2019), Jan. 8, 2007, 8 pages.
NVIDIA "PDK User's Guide: Preface Personal Media Device," Manual, published Sep. 4, 2007, 39 pages.
NVIDIA, "NVIDIA and ASUS Deliver World's First Notebook with Windows Sideshow Secondary Display," Press Release, available at https://www.nvidia.com/object/IO_38772.html (retrieved May 6, 2019), Jan. 8, 2007, 5 pages.
NVIDIA, "NVIDIA® Preface™ Platform Enables Windows Vista On The Go," Press Release, available at https://www.nvidia.com/object/IO_38775.html (retrieved May 6, 2019), Jan. 8, 2007, 5 pages.
United States Patent and Trademark Office, "Advisory Action" issued in connection with U.S. Appl. No. 14/866,894, issued on Aug. 17, 2020, 3 pages.
United States Patent and Trademark Office, "Advisory Action" issued in connection with U.S. Appl. No. 14/866,894, issued on Nov. 5, 2019, 3 pages.
United States Patent and Trademark Office, "Final Office Action" issued in connection with U.S. Appl. No. 14/866,894, issued on Jul. 29, 2019, 18 pages.
United States Patent and Trademark Office, "Final Office Action" issued in connection with U.S. Appl. No. 14/866,894, issued on Jun. 23, 2020, 17 pages.
United States Patent and Trademark Office, "Non-Final Office Action" issued in connection with U.S. Appl. No. 14/866,894, issued on Feb. 21, 2020, 17 pages.
United States Patent and Trademark Office, "Non-Final Office Action" issued in connection with U.S. Appl. No. 14/866,894, issued on Oct. 8, 2020, 18 pages.
United States Patent and Trademark Office, "Non-Final Office Action" issued in connection with U.S. Appl. No. 14/866,894, issued on Dec. 14, 2018, 12 pages.
European Patent Office, "Extended European Search Report," issued in connection with European Patent Application No. 20197337.7, dated Mar. 9, 2021, 11 pages.
European Patent Office, "Rule 62a(1) Communication," issued in connection with European Patent Application No. 20197335.1, dated Mar. 17, 2021, 2 pages.
United States Patent and Trademark Office, "Final Office Action," issued in connection with U.S. Appl. No. 14/866,894, mailed on May 11, 2021, 17 pages.
International Searching Authority, "International Search Report," issued in connection with PCT Application No. PCT/US2016/048953, issued on Nov. 23, 2016, 3 pages.
International Searching Authority, "Written Opinion of the International Searching Authority," issued in connection with PCT Application No. PCT/US2016/048953, issued on Nov. 23, 2016, 9 pages.
United States Patent and Trademark Office, "Non-Final Office Action," issued in connection with U.S. Appl. No. 16/586,225, dated Jun. 15, 2021, 14 pages.
United States Patent and Trademark Office, "Non-Final Office Action," issued in connection with U.S. Appl. No. 16/728,774, dated May 3, 2021, 12 pages.
European Patent Office, "Extended European Search Report," issued in connection with European Patent Application No. 20197335.1, dated Jul. 16, 2021, 11 pages.
International Searching Authority, "International Preliminary Report on Patentability," issued in connection with PCT/US2016/048953, dated Mar. 27, 2018, 10 pages.

(56) References Cited

OTHER PUBLICATIONS

International Searching Authority, "Search Report and Written Opinion," issued in connection with PCT Application No. PCT/CN2020/098326, mailed Mar. 29, 2021, 9 pages.

United States Patent and Trademark Office, "Notice of Allowance and Fee(s) Due," issued in connection with U.S. Appl. No. 14/866,894, mailed on Jul. 30, 2021, 8 pages.

United States Patent and Trademark Office, "Final Office Action," issued in connection with U.S. Appl. No. 16/728,774, mailed on Sep. 22, 2021, 20 pages.

United States Patent and Trademark Office, "Non-Final Office Action," issued in connection with U.S. Appl. No. 16/421,217, mailed on Oct. 27, 2021, 29 pages.

European Patent Office, "Communication pursuant to Article 94(3) EPC," issued in connection with European Patent Application No. 20164273.3, dated Sep. 28, 2021, 9 pages.

United States Patent and Trademark Office, "Notice of Allowance," issued in connection with U.S. Appl. No. 16/586,225, dated Dec. 8, 2021, 6 pages.

United States Patent and Trademark Office, "Corrected Notice of Allowability," issued in connection with U.S. Appl. No. 16/586,225, dated Dec. 16, 2021, 3 pages.

International Searching Authority, "International Preliminary Report on Patentability," issued in connection with application No. PCT/CN2019/079790, dated on Sep. 28, 2021, 5 pages.

United States Patent and Trademark Office, "Non-Final Office Action" issued in connection with U.S. Appl. No. 16/728,899, issued on Dec. 8, 2021, 9 pages.

United States Patent and Trademark Office, "Notice of Allowance and Fee(s) Due," issued in connection with U.S. Appl. No. 16/728,774, mailed on Feb. 2, 2022, 9 pages.

United States Patent and Trademark Office, "Notice of Allowance and Fee(s) Due" issued in connection with U.S. Appl. No. 16/421,217, issued on Mar. 9, 2022, 6 pages.

United States Patent and Trademark Office, "Corrected Notice of Allowability" issued in connection with U.S. Appl. No. 16/586,225, issued on Mar. 16, 2022, 3 pages.

United States Patent and Trademark Office, "Notice of Allowance and Fee(s) Due," issued in connection with U.S. Appl. No. 16/586,225, dated Apr. 29, 2022, 6 pages.

United States Patent and Trademark Office, "Corrected Notice of Allowability," issued in connection with U.S. Appl. No. 16/586,225, dated May 18, 2022, 3 pages.

United States Patent and Trademark Office, "Non-Final Office Action," issued in connection with U.S. Appl. No. 16/725,467, dated Apr. 7, 2022, 19 pages.

Cravotta, Nicholas, "Optimizing Proximity Sensing for Consumer Electronics Applications," Digi-Key Electronics, Apr. 26, 2012, 9 pages.

Chethan, "Proximity Sensing with CapSense," Cypress AN92239, 2016, 62 pages.

Intellectual Property India, "Examination Report," issued in connection with Indian Patent Application No. 202147037534, dated Dec. 28, 2022, 6 pages.

Japanese Patent Office, "Notice of Reasons for Rejection," issued in connection with Japanese Patent Application No. 2021-538701, dated Mar. 3, 2023, 7 pages (English translation included).

GSMArena team, "Samsung Galaxy Fold review," GSMARENA, dated Apr. 26, 2019, retrieved from https://www.Jsmarena.com/samsung_galaxy_fold-review-1926p4.php on Jun. 8, 2023, 8 pages.

Samsung, "Samsung Galaxy Fold Now Available," Samsung Global Newsroom, dated Sep. 5, 2019, retrieved from https://news.samsung.com/global/samsung-galaxy-fold-now-available) on Jun. 8, 2023, 7 pages.

GSMArena team, "Samsung Galaxy Fold long-term review," GSMARENA, dated Nov. 9, 2019, retrieved from https://www.gsmarena.com/samsung_galaxy_fold_long_term-review-1996p7.php on Jun. 8, 2023, 8 pages.

Industrial Property Cooperation Center, "Search Report," issued in connection with Japanese Patent Application No. 2021-538701, dated Feb. 15, 2023, 58 pages (English Translation Included).

United States Patent and Trademark Office, "Notice of Allowance and Fee(s) Due," issued in connection with U.S. Appl. No. 16/728,899, issued on Apr. 3, 2023, 10 pages.

United States Patent and Trademark Office, "Non-Final Rejection" issued in U.S. Appl. No. 17/732,173, mailed on May 30, 2023, 28 pages.

Japanese Patent Office, "Decision of Refusal," issued in connection with Japanese Patent Application No. 2021-538701, dated Jun. 6, 2023, 6 pages. [English Translation Included].

International Searching Authority, "International Preliminary Report on Patentability," issued in connection with International application No. PCT/US2021/049649, dated Jun. 13, 2023, 10 pages.

United States Patent and Trademark Office, "Notice of Allowability," issued in connection with U.S. Appl. No. 16/728,899, dated Jun. 22, 2023, 3 pages.

United States Patent and Trademark Office, "Notice of Allowance," issued in connection with U.S. Appl. No. 16/725,467, dated Jun. 29, 2023, 6 pages.

United States Patent and Trademark Office, "Corrected Notice of Allowability," issued in connection with U.S. Appl. No. 17/856,587, dated Jul. 3, 2023, 2 pages.

United States Patent and Trademark Office, " Final Office Action," issued in connection with U.S. Appl. No. 17/129,465, mailed on Jul. 7, 2023, 15 pages.

International Searching Authority, "International Search Report and Written Opinion," issued in connection with International Patent Application No. PCT/US2022/022196, dated Jun. 30, 2022, 10 pages.

United States Patent and Trademark Office, "Notice of Allowance and Fee(s) Due," issued in connection with U.S. Appl. No. 16/725,467, dated Feb. 23, 2023, 9 pages.

United States Patent and Trademark Office, "Supplemental Notice of Allowability," issued in connection with U.S. Appl. No. 16/725,467, dated Mar. 1, 2023, 3 pages.

European Patent Office, "Communication pursuant to Article 71(3) EPC," issued in connection with European Patent Application No. 20164273.3, dated Dec. 23, 2022, 9 pages.

European Patent Office, "Communication pursuant to Article 94(3) EPC," issued in connection with European Patent Application No. 20197337.7-1218, mailed on Aug. 10, 2023, 10 pages.

United States Patent and Trademark Office, "Non-Final Office Action," issued in connection with U.S. Appl. No. 18/322,270, dated Feb. 7, 2024, 15 pages.

International Searching Authority, "International Search Report," issued in connection with PCT Application No. PCT/CN2022/084726, dated Jan. 4, 2023, 4 pages.

International Searching Authority, "Written Opinion," issued in connection with PCT Application No. PCT/CN2022/084726, dated Jan. 4, 2023, 4 pages.

United States Patent and Trademark Office, "Non-Final Office Action," issued in connection with U.S. Appl. No. 17/129,465, dated Jan. 5, 2023, 12 pages.

United States Patent and Trademark Office, "Advisory Action," issued in connection with U.S. Appl. No. 16/725,467, dated Jan. 4, 2023, 3 pages.

European Patent Office, "Communication pursuant to Article 94(3) EPC," issued in connection with European Patent Application No. 20194494.9, dated Jan. 24, 2023, 6 pages.

European Patent Office, "Communication pursuant to Article 94(3) EPC," issued in connection with European Patent Application No. 20197335.1-1224, dated Oct. 5, 2023, 5pages.

United States Patent and Trademark Office, "Notice of Allowance and Fee(s) Due," issued in connection with U.S. Appl. No. 17/732,173, dated Oct. 25, 2023, 8 Pages.

United States Patent and Trademark Office, "Non-Final Office Action," issued in connection with U.S. Appl. No. 17/129,465, dated Feb. 1, 2024, 13 pages.

European Patent Office, "Extended European Search Report," issued in connection with European patent Application No. 20941909.2-1224, dated Feb. 26, 2024, 8 pages.

(56) References Cited

OTHER PUBLICATIONS

United States Patent and Trademark Office, "Non-Final Office Action," issued in connection with U.S. Appl. No. 17/928,595, dated Apr. 9, 2024, 17 pages.

* cited by examiner

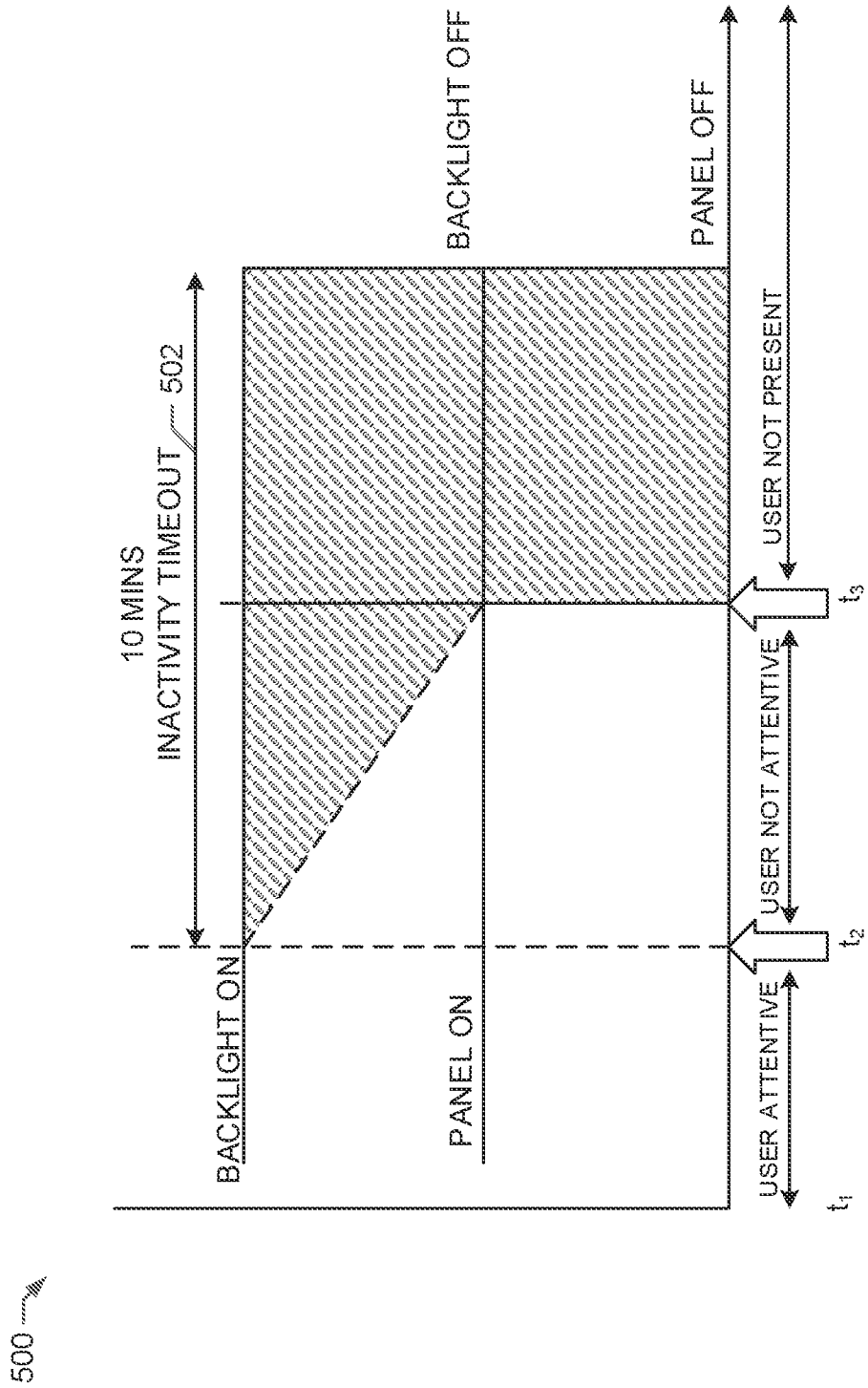

SMART DISPLAY PANEL APPARATUS AND RELATED METHODS

RELATED APPLICATION

This patent arises under 35 U.S.C. § 371 from a U.S. National Stage of International Patent Application No. PCT/CN2019/079790, which was filed on Mar. 27, 2019. International Patent Application No. PCT/CN2019/079790 is hereby incorporated herein by reference in its entirety. Priority to International Patent Application No. PCT/CN2019/079790 is hereby claimed.

FIELD OF THE DISCLOSURE

This disclosure relates generally to electronic display devices and, more particularly, to smart display panel apparatus and related methods.

BACKGROUND

A display panel of an electronic user device (e.g., a personal computer, a smartphone, a tablet) enables a user to view graphical user interface content via a display screen while interacting with the device. The display panel includes panel electronics that control the display of the content via the display screen and a backlight that outputs light to illuminate the display screen for ease of viewing by the user. The backlight and panel electronics of the display panel consume power when the user device is in an operative state. In some examples, the brightness of the backlight can be adjusted via user input.

BRIEF DESCRIPTION OF THE DRAWINGS

FIG. 5 is graph depicting changes in respective power states of a backlight and panel electronics of a display panel based on implementation of the power management rules of FIGS. 3 and/or 4 by the example display panel controller of FIG. 1.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
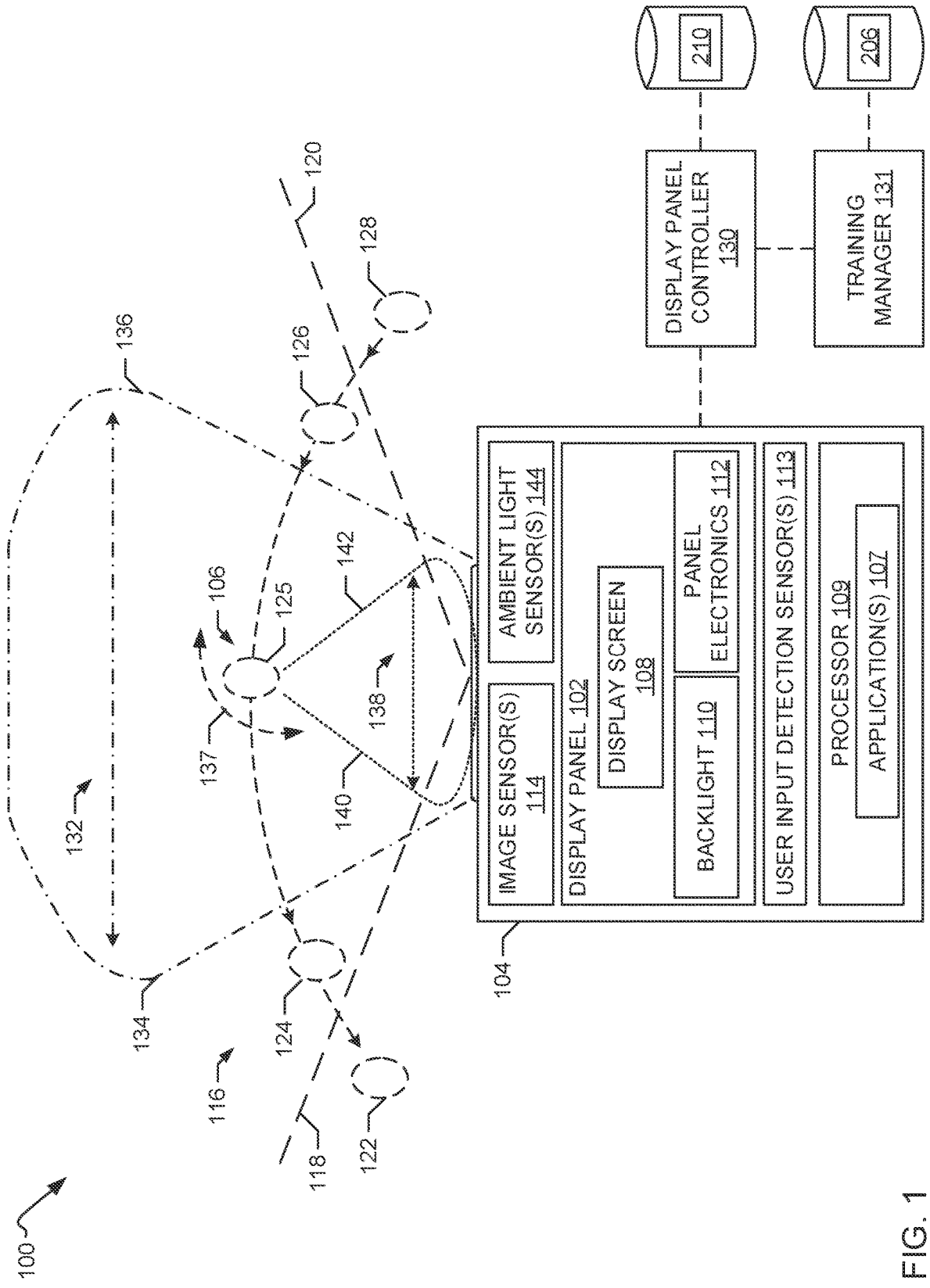
FIG. 1 illustrates an example system constructed in accordance with teachings of this disclosure and including an example training manager and an example display panel controller for controlling power of a display panel of a user device.

A display panel of an electronic user device (e.g., a personal computer, a smartphone, a tablet) enables a user to view graphical user interface content via a display screen while interacting with the device. The display panel includes panel electronics that control the display of the content via the display screen and a backlight that outputs light to illuminate the display screen for ease of viewing by the user. The backlight and panel electronics of the display panel consume power when the user device is in an operative or powered-on state to provide for the display of data via the display screen.

In some instances, the display panel consumes power to output data for display and illuminate the display screen while the user device is in operative state but the user is not viewing the display screen. For example, the user may turn away from the display screen to talk to a person, read paper documents, etc. In some examples, the user may step away from the user device for a period of time (e.g., during lunch, overnight) without powering off the device. However, the panel electronics of the display panel continue to output data for display and the backlight continues to illuminate the display screen even though the user is not actively looking at the display screen for some period of time (e.g., minutes, hours, etc.). In some examples, power consumption of the display panel can represent relatively large portion (e.g., 30%-40%) of a total power consumption of the user device and, thus, can affect, for instance, a life of a battery of the user device.

In an effort to reduce power consumption by a user device when the device is not being actively used by a user, the display panel may operate in a low power state based on an indication that the user is not presently using the device. For instance, some known examples for conserving power include automatically turning off the backlight and, in some cases, the panel electronics of the display panel after a predefined period of time (e.g., 30 seconds, 5 minutes, 10 minutes) in which no user inputs are received at the user device. In some instances, the display panel is turned off as the device enters a sleep or hibernation mode after a predefined period of user inactivity. However, relying on the absence of user inputs such as keyboard inputs, mouse clicks, touch screen inputs, etc. to control operation of the display panel does not accurately reflect if the user is no longer using the device. Because the duration of the timeout period for causing the display panel to move to the low power state cannot be dynamically adjusted, the timeout periods may be too short or too long to effectively conserve power in view of different user interactions with the device. A display panel timeout period that is too long results in missed opportunities for conserving power when the user is no longer using the device. Conversely, a timeout period that is too short may increase power consumption by the device as the user repeatedly instructs the display panel to return to an active state because the user has only stopped using the device for brief intervals of time.

Some known examples for managing display panel power consumption rely on user presence as an indication of whether the display panel should remain on. For example, some devices detect user presence based on transmission and detection of Bluetooth® signals between the electronic device and another Bluetooth®-enabled user device carried by the user (e.g., a smartphone, a smart watch). However, such examples require the user to carry a Bluetooth® transmitting device. Also, such examples do not determine whether the user is actively engaged with the device including the display panel of interest. As another example, some devices include proximity sensors that detect user presence relative to the device. However, user presence alone is not an accurate indicator of whether the user is viewing the display screen. For instance, the user may be sitting at his or her desk in front the user device (e.g., a desktop computer) but turned away from the display screen as the user talks to another person. Some known examples employ eye-tracking techniques to determine whether a user is actively looking at the display screen. However, tracking a user's eye movements may increase energy consumption by the electronic device to process image data captured by image sensors of the device and to analyze the data with respect to the user's eye position over time.

Example systems and methods disclosed herein provide for dynamic power control of a display panel of a user device based on detection of a user's face and a determination of a direction of the user's gaze relative to the user device. Examples disclosed herein employ a multi-tier determination as to whether the user is (1) present relative to the user device (e.g., located proximate to the user device) and (2) attentive to the display screen of the device. Examples disclosed herein selectively control operation of the panel electronics and the backlight of the display panel based on the determinations of user presence and attentiveness relative to the device. As a result, examples disclosed herein provide for increased power savings as compared to known examples that rely on, for instance, user presence alone or predefined timeout periods of user inactivity.

Examples disclosed herein analyze image data generated by image sensor(s) of the user device to determine whether a user is present within a field of view (FoV) of the image sensor(s) based on facial recognition analysis. Based on the detection of a user face in the FoV of the image sensor(s), examples disclosed herein control operation of the panel electronics and the backlight of the display panel. When a user is not detected within the FoV of the image sensor(s), examples disclosed herein determine that the user is not present relative to the user device and, accordingly, instruct the display panel to turn off to conserve power.

When the user is determined to be present at the user device, examples disclosed herein further analyze the image data with respect to a direction of the user's gaze relative to the image sensor(s). Examples disclosed herein perform facial feature recognition for the image data to determine a position of the user's face relative to the image sensor(s). Based on the facial feature analysis, examples disclosed herein determine whether the display screen is within a field of view of the user, which serves as an indication that the user is likely to be looking at or attentive to the display screen. For instance, if only one ear is detected in the image data, examples disclosed herein determine that the user is looking partially away from the display screen. Conversely, if two eyes are detected in the image data, examples disclosed herein determine that the user is looking at the display screen.

Examples disclosed herein selectively adjust a brightness (e.g., lumen level) of the backlight of the display panel based on the direction of the user's gaze. For example, if the user gaze is directed away from the display screen, examples disclosed herein dim the backlight to conserve power while the user is looking away. In examples in which the user is determined to be turning toward the display screen based on the image data analysis over time, the brightness of the backlight is increased in anticipation of the user interacting with the device. In examples in which the user is determined to be turning away from the display screen, the brightness of the backlight is decreased to save power as the display screen leaves the user's field of view.

In some examples disclosed herein, at least some of the image data analysis is performed one or more processors that are in communication with the image sensor(s) and that in operate in a low power mode or an ultra-low power mode (e.g., consuming less than 10 mW). In such examples, the processor(s) (e.g., digital signal processor(s)) generate metadata indicating whether the user is present (e.g., represented by "1") or absent (e.g., represented by "0") based on the facial recognition analysis of the image data. The metadata indicating user present or absence is used to control operation of the display panel, thereby reducing power costs associated with transmitting, processing, and/or analyzing image data.

In some examples, the gaze analysis is not performed until the user is determined to be within a particular proximity range of the user device so as not to expend resources when the user is at distance where he or she is unlikely to be able to easily view content on the display screen. In some examples, if the user is providing inputs at the device (e.g., keyboard inputs, touch screen inputs), examples disclosed herein refrain from analyzing the image data with respect to user presence and gaze to save power while the user is interacting with the device and, thus, is known to be present and attentive to the device.

Also disclosed herein are systems and methods to automatically adjust the brightness of a backlight for a display screen of a user device after a user has manually changed the brightness setting. Some user devices automatically adjust a brightness of the backlight based on sensor data indicative of ambient light in an environment in which the device is located. However, some users may turn off the auto-brightness setting and manually dim or turn off the backlight when, for instance, the user is in a dark room because the user may find the screen to be too brightly lit. In such cases, when the user returns to a brighter environment (e.g., a sunlit environment), the display screen may be too dark for the user to view. Examples disclosed herein determine changes in ambient light levels in an environment and/or between environments in which the user device is located. When a change from, for instance, a dark or low light level to a bright light level is detected, examples disclosed here automatically readjust the brightness of the backlight from the user-defined manual setting to enable the user to view the display screen without having to manually readjust the brightness setting. Examples disclosed herein compare the changes in ambient light levels to predefined thresholds to determine whether the backlight should continue to output light at the user-defined brightness setting or if the auto-brightness setting should be reactivated to facilitate user comfort in viewing the display screen.

FIG. 1 illustrates an example system 100 constructed in accordance with teachings of this disclosure for controlling a display panel 102 of a user device 104 based on interaction of a user or subject 106 (the terms "the terms "user" and "subject" are used interchangeably herein and both refer to a biological creature such as a human being) with a display screen 108 of the display panel 102. The user device 104 can include a personal computer, a laptop, a tablet, a smart phone, etc. In the example of FIG. 1, the user 106 accesses one or more applications 107 (e.g., a word processing application, a web browser, a video player, etc.) executed by a processor 109 of the user device 104. The user 106 views digital content associated with the application(s) 107 (e.g., electronic documents, webpages, video, etc.) via the display screen 108. The display panel 102 of the example of FIG. 1 includes a backlight 110, or means for illuminating the display screen 108 for viewing by the user 106. The display panel of FIG. 1 includes panel electronics 112, or a circuit board including hardware such as a timing controller to provide for the output of graphics via the display screen 108.

During operation of the user device 104, the backlight 110 and the panel electronics 112 consumer power to, for instance, illuminate the display screen 108, process image data for display via the display screen 108, etc. Total power consumption (e.g., wattage) of the display panel 102 is based on power consumption of the backlight 110 and power consumption of the panel electronics 112. In some examples, the power consumption of the display panel 102 can represent relatively large portion of a total power consumption of the user device 104.

When the user device 104 is in powered-on operational state, the user 106 can interact with the user device 104 (e.g., with the application(s) 107 installed thereon) by providing inputs via, for instance, a keyboard and/or a mouse associated with the user device 104. In some examples, the display screen 108 is a touch screen and the user 106 provides inputs via the touch display screen 108 using his or her fingers. The example user device 104 includes user input detection sensor(s) 113. The user input detection sensor(s) 113 are in communication with, for instance, peripheral devices such as a keyboard, touchscreens, etc. and generate data indicative of interactions of the user 106 with the user device 104. The user input detection sensor(s) 113 transmit data indicative of user activity or inactivity to the processor 109. Based on the data generated by the user input detection sensor(s) 113, the processor 109 may instruct the display panel 102 to turn off the display screen 108 after a predefined period of time with no user input (e.g., 10 minutes, 15 minutes). In some examples, after a predefined period of time without user activity, the processor 109 may cause the user device 104 to enter a sleep mode, or a mode in which the user device 104 is in a low power state after a period of inactivity.

Although the processor 109 may cause the user device 104 to enter a sleep mode and the display panel 102 to turn off based on predefined periods of user inactivity, such predefined periods may not accurately reflect the activity of the user 106 with respect to the user device 104. For instance, there may be periods of time in which the user 106 is not looking at the display screen 108 or is not present relative to the user device 104 that are shorter than the predefined timeout periods that trigger the processor 109 to turn off the display screen 108. For example, during operation of the user device 104, the user 106 may avert his or her gaze from the display screen 108 to, for instance, talk to another person who has entered the room. In some examples, the user 106 may walk away from the user device 104 and then return to the user device 104. Thus, there are periods of time in which the user 106 may not be attentive to the display screen 108 or in the presence of the user device 104 that are not accurately captured by predefined timeout periods of user inactivity. However, during these periods of time in which the user 106 is not paying attention to the display screen 108, the display panel 102 continues to consumer power. For instance, the backlight 110 of the display panel 102 may continue to illuminate the display screen 108 although the user 106 has averted his or her gaze from the display screen 108 to, for instance, talk to another person in the room with the user 106.

The example user device 104 of FIG. 1 includes one or more image sensors 114. The image sensor(s) 114 provide means for generating image data. In FIG. 1, the image sensor(s) 114 include a front-facing camera of the user device 104. The image sensor(s) 114 can be coupled to the display panel 102 and/or other portions of the user device 104 (e.g., to a hinge of a laptop). The image sensor(s) 114 of the example of FIG. 1 are associated with an imaging field of view (FoV) 116 defined between the dashed lines 118, 120 in FIG. 1. The imaging FoV 116 can correspond to, for instance, a field of view of the front-facing camera or image sensor 114 of the user device 104. In the example of FIG. 1, the image sensor(s) 114 generate image data representing objects present within the imaging FoV 116.

As shown by the dashed circles 122, 124, 125, 126, 128, the user 106 can move in and out of the imaging FoV 116 while the user device 104 is in the powered-on state. The user 106 may be within the imaging FoV 116 when working at a desk on which the user device 104 rests. The user 106 may move out of the imaging FoV 116 when the user 106 walks away from the user device 104 to, for instance, answer a doorbell. The image sensor(s) 114 of FIG. 1 generate image data that includes the user 106 when the user 106 is at the positions corresponding to the dashed circles 124, 125, 126. However, image data generated when the user 106 is at the positions corresponding to the dashed circles 122, 128 does not include the user 106.

In the example of FIG. 1, the image sensor(s) 114 generate image data when the user device 104 is in a powered-on state, including when the user device 104 is in a sleep mode. Put another way, the image sensor(s) 114 operate in an always-on mode. To conserve power while providing for always-on sensing, the image sensor(s) 114 of FIG. 1 operate in a low power mode. For example, the front-facing camera, or the image sensor(s) 114, of the user device 104 can capture image data at a low resolution when operating in the always-on mode to conserve power (e.g., based on instructions from the processor 109 of the user device). When the front-facing camera is generating image data during use of the device by the user in connection with, for instance, a video conferencing application, the front-facing camera can switch to generating high-resolution image data (e.g., based on instructions from the processor 109 of the user device). The front-facing camera can return to operating in the always-on, low power mode after operation of the video-conferencing application has ended. Thus, is some examples, the example of FIG. 1 further converses energy by using existing means for generating image data such as the front-facing camera of the user device 104 to capture image data for determining user presence. In the example of FIG. 1, the image sensor(s) 114 can generate image data at a rate of, for instance, 10 frames/second while operating in always-on, low power mode.

In the example system 100 of FIG. 1, the image data generated by the image sensor(s) 114 is processed by a display panel controller 130. The display panel controller 130 of FIG. 1 serves to process the image data generated by the image sensor(s) 114 to determine whether the user 106 is present within the imaging FoV 116. The display panel controller 130 of FIG. 1 controls one or more of the backlight 110 and/or the panel electronics 112 of the display panel 102 based on the presence of the user 106 in the imaging FoV 116. The example display panel controller 130 of FIG. 1 provides means for controlling operation of the display panel 102 to conserve power consumption by the display panel 102 during periods of user inactivity at the user device 104.

The example display panel controller 130 can be implemented by one or more processors of the user device 104, such as the processor 109 of FIG. 1. In some examples, at least some of the analysis performed by the display panel controller 130 is implemented by processor(s) of the user device 104 operating in a low power mode or ultra-low power mode, such as digital signal processor(s). In other examples, the display panel controller 130 is implemented by one or more cloud-based devices, such as one more servers, processors, and/or virtual machines located remotely from the user device 104. In other examples, some of the analysis performed by the display panel controller 130 is implemented by cloud-based devices and other parts of the analysis are implemented by local processor(s) or one or more user device(s).

In some examples, the display panel controller 130 receives the image data in substantially real-time (e.g., near the time the data is collected). In other examples, the display panel controller 130 receives the image data at a later time (e.g., periodically and/or aperiodically based on one or more settings but sometime after the image data was generated (e.g., seconds later, minutes later). The display panel controller 130 can perform one or more operations on the image data such as filtering the raw image data and/or removing noise from the image data.

In the example of FIG. 1, the display panel controller 130 executes one or more learned models to determine a presence of the user 106 within the imaging FoV 116 based on the image data generated by the image sensor(s) 114. The example display panel controller 130 of FIG. 1 is trained by a training manager 131 using machine learning technique(s) (e.g., supervised learning) and training image data including the user 106 and/or other users to detect human face(s) and/or to recognize particular human facial feature(s) such as a nose, an ear, a mouth, etc. Using the learned face detection model(s), the display panel controller 130 analyzes the image data generated by the image sensor(s) 114 and determines whether the user 106 is present within the imaging FoV 116. Based on the detection of the user 106 in the imaging FoV 116 and one or more predefined rules, the display panel controller 130 controls operation of the backlight 110 and the panel electronics 112.

The example training manager 131 can be implemented by the processor 109 of the user device 104. In other examples, the training manager 131 is implemented by one or more cloud-based devices, such as one more servers, processors, and/or virtual machines. In other examples, some of the analysis performed by the training manager 131 is implemented by cloud-based devices and other parts of the analysis are implemented by processor(s) or one or more user device(s). The processor(s) and/or cloud-based device(s) that are used to implement the training manager 131 can be the same or different as the processor(s) and/or cloud-based device(s) used to implement the display panel controller 130.

As an example, the display panel controller 130 can analyze the image data using the face detection model(s) and determine that the user 106 is not present in the imaging FoV 116 (e.g., as represented by the dashed circle 122 or the dashed circle 128 of FIG. 1). In such examples, the display panel controller 130 generates one or more instructions directing the backlight 110 and the panel electronics 112 to turn off. In some examples, the display panel controller 130 generates the instruction(s) for the backlight 110 and the panel electronics 112 to turn off sooner than would occur if operation of the display panel 102 was controlled on a predefined timeout period of user inactivity (e.g., after 15 minutes). Thus, the display panel controller 130 can provide for additional power savings by controlling the display panel 102 based on presence of the user 106 relative to the user device 104.

In some examples, the display panel controller 130 determines that the user 106 is present within the imaging FoV 116 (e.g., represented by any of the dashed circles 124, 125, 126) based on the analysis of the image data using the face detection model(s). In such examples, the display panel controller 130 instructs the panel electronics to turn on. In some examples, the display panel controller 130 also instructs the backlight 110 to turn on and output light at a default brightness setting (e.g., a brightness level predefined by a manufacturer or the user) in anticipation of the user 106 viewing the display screen 108.

In other examples in which the user is determined to be present at the user device 104, the display panel controller 130 refrains from instructing the backlight 110 to turn on or refrains from adjusting a brightness (e.g., lumen level) of the backlight 110 until the display panel controller 130 determines that the user 106 is within a display field of view 132 associated with the display screen 108, as defined by the dashed lines 134, 136 of FIG. 1. Put another way, when the user 106 is present in the imaging FoV 116, the example display panel controller 130 considers whether the brightness of the backlight 110 should be adjusted based on the position of the user 106 relative to the display screen 108 for further energy savings.

In the example of FIG. 1, the display FoV 132 is defined based on an intended viewing distance of the user 106 from the display screen 108 and a viewing angle of the display screen 108 (e.g., a maximum angle at which the display screen 108 can be viewed by a user with adequate visual output with respect to hues, contrast, etc. as defined by, for instance, manufacturer specifications). The viewing angle and/or the viewing distance for the display screen 108 can be based on, for instance, a size of the display screen 108, the type of display screen (e.g., LCD), etc. The example display panel controller 130 analyzes the image data generated by the image sensor(s) 114 to determine if the user 106 is within the display FoV 132 based on the learned face detection model(s) and the predefined range of the display FoV 132 for the display screen 108.

In the example of FIG. 1, if the display panel controller 130 determines that the user 106 is within the imaging FoV 116 but not within the display FoV 132, the display panel controller 130 generates instruction(s) for the panel electronics 112 to be turned on or activated based on a likelihood that the user 106 will look at the display screen 108 in the near future because the user 106 is in proximity to the user device 104. However, in an effort to reduce unnecessary power consumption by the display panel 102, the display panel controller 130 refrains from activating the backlight 110 until the display panel controller 130 determines that the user 106 is within the display FoV 132.

When the example display panel controller 130 of FIG. 1 determines that the user is within the display FoV 132, the display panel controller 130 analyzes the image data using the learned face detection model(s) to identify a direction of a gaze of the user 106 relative to the image sensor(s) 114. In the example of FIG. 1, the direction of the user's gaze relative to the image sensor(s) 114 serves as an indicator of the user's gaze relative to the display screen 108 and, thus, the attentiveness of the user 106 to the display screen 108.

The display panel controller 130 determines gaze direction based on identification of facial features in the image data, including whether, for example, one ear is visible, two eyes are visible, etc. Based on the analysis of the gaze of the user 106, the display panel controller 130 determines whether the user 106 is attentive to the display screen 108 (e.g., paying attention to content on the display screen 108). Although the user 106 is in the display FoV 132, the user 106 may not be paying attention to the display screen 108 but instead, may be at least partially turned away from the display screen 108, as represented by the curved arrow 137 of FIG. 1. For instance, the user 106 may be sitting at his or her desk within the display FoV 132, but turned away from the display screen 108 while talking to a colleague, reading a paper document, etc. The example display panel controller 130 controls the brightness of the backlight 110 based on the analysis of the user's gaze to further manage power consumption.

In particular, when the user 106 is in the display FoV 132, the example display panel controller 130 of FIG. 1 determines a user field of view 138 based on a position of the user 106 within the display FoV 132 (e.g., based on x and y coordinates within the display FoV 132) and an angle of a face of the user 106 relative to the image sensor(s) 114 of the user device 104. In the example of FIG. 1, the user FoV 138 is defined by the dashed lines 140, 142. To determine the angle of the user's face relative to the image sensor(s) 114, the example display panel controller 130 analyzes facial features and an orientation of a head of the user 106 as captured in the image data collected by the image sensor(s) 114. In the example of FIG. 1, the display panel controller 130 is trained by the training manager 131 using machine learning algorithm(s) to recognize facial features.

For example, if the display panel controller 130 identifies a nose or a mouth of the user 106 in the image data, the display panel controller 130 determines that the user's gaze is directly or substantially directly facing the image sensor(s) 114. As a result, the display panel controller 130 determines that the display screen 108 is within the user's field of view 138 and the display panel controller 130 instructs the backlight 110 to output light at a default brightness setting.

As another example, if the display panel controller 130 identifies only one ear of the user 106 in the image data, the display panel controller 130 determines that a face of the user 106 is at an angle relative to the image sensor(s) 114 (e.g., the user's head is turned at a 45-90° angle relative to the image sensor(s) 114). As a result, the display panel controller 130 reduces (e.g., dims) a brightness of the backlight 110 by a predefined percentage to save power while the user 106 is present but not actively looking at the display screen 108. Put another way, when the user's head is turned at an angle relative to the image sensor(s) 114, the user 106 is gazing to the right or the left of the display screen 108 and, thus, at least a portion of the display screen 108 is not within the user's field of view 138. In such examples, the backlight 110 can be dimmed to conserve power while the user's gaze is averted from the display screen 108.

As another example, if the display panel controller 130 determines the user 106 is present within the display FoV 132 but does not identify any facial features such as a nose, mouth, ear, etc. in the image data, the display panel controller 130 determines that the user's gaze is pointed in a direction opposite the image sensor(s) 114. As a result, the display panel controller 130 instructs the backlight 110 to turn off because the user 106 is not looking at the display screen 108, despite being present within the display FoV 132. Put another way, when the user's face is oriented in a direction opposite the image sensor(s) 114, the display screen 108 is not in the user's field of view 138 and, therefore, the backlight 110 can be turned off to reduce power consumption while the user 106 is turned away from the display screen 108. Thus, the example display panel controller 130 of FIG. 1 considers the orientation of the face of the user 106 relative to the image sensor(s) 114 as an indication of whether the user 106 is attentive to the display screen 108.

The display panel controller 130 of FIG. 1 analyzes the image data generated by the image sensor(s) 114 with respect to the orientation and position of the user 106 within the display FoV 132 to identify changes in the user's field of view as the user moves his or her gaze toward or away from the user device 104. For example, the display panel controller 130 may determine that the user's gaze is turned away from the image sensor(s) 114 based on image data collected at a first time. The display panel controller 130 instructs the backlight 110 to dim because the user 106 is determined not to be attentive to the display screen 108. However, the display panel controller 130 may then determine that the user's gaze is turning toward the display screen 108 based on the identification of facial features such as the user's nose and mouth in image data collected at a second time occurring after the first time. Accordingly, the display panel controller 130 instructs the backlight 110 to increase brightness to illuminate the display screen 108 as the user 106 directs his or her gaze toward the display screen 108.

In some examples, the display panel controller 130 instructs the backlight 110 to gradually increase brightness (e.g., by a predefined percentage) when the display panel controller 130 determines that the user's gaze is turning toward the display screen 108 or to gradually decrease brightness (e.g., by a predefined percentage) when the display panel controller 130 determines that the user's gaze is turning away from the display screen 108 so as not to distract or disturb the user 106 with sudden changes in brightness. In some examples, the display panel controller 130 controls the rate of change of the brightness of the backlight 110 based on an expected rate rotational rate of change of the user's gaze toward or away from the display screen 108. For example, the display panel controller 130 can instruct the backlight 110 to increase brightness at a first rate when the display panel controller 130 determines that the user's gaze is turning toward the image sensor(s) 114

(and, thus, the display screen 108) from a position in which the user 106 is at angle of 45° relative to the image sensor(s) 114. The display panel controller 130 can instruct the backlight 110 to increase brightness at a second rate slower than the first rate when the display panel controller 130 determines that the user's gaze is turning toward the image sensor(s) 114 from a position in which the user 106 is facing opposite (i.e., 180° away) from the image sensor(s) 114 because of the increased amount of time for the display screen 108 to enter the user's field of view 138.

As another example, the display panel controller 130 may instruct the backlight 110 to dim more quickly when a face of the user 106 is positioned at angle of 90° relative to the image sensor(s) 114 than an angle of 60°. As mentioned above, the display panel controller 130 can distinguish between different head orientations based on the facial and/or head features identified in the image data (e.g., a portion of the user's nose, a full image of an ear, etc.). In such examples, because the display screen 108 is not in the user FoV 138 when the user's face is positioned at 90° relative to the image sensor(s) 114, the display screen 108 can be dimmed quickly without disturbing the user 106 as compared to when the user's face is positioned at 60° relative to the image sensor(s) 114 and the display screen 108 remains at least partially in the user FoV 138. Thus, the display panel controller 130 minimizes disruption to the user 106 as the gaze of user 106 turns away from and toward the image sensor(s) 114 at different angles.

In the example of FIG. 1, analysis of the image data and the corresponding control of the display panel 102 by the display panel controller 130 can be refined based on learned feedback. For example, the display panel controller 130 can adjust the rate at which the backlight 110 increases or decreases the brightness of the display screen 108 based on learned data with respect to the rate of rotational change of the gaze of the user 106 (or another user) toward or away from the image sensor(s) 114.

In some examples, the user 106 can define one or more settings to be implemented by the display panel controller 130 with respect to, for instance, the percentage by which the backlight 110 dims, a time period after which the panel electronics 112 turn off when the user 106 leaves the imaging FoV 116, etc. Thus, in some examples, the user 106 can define, change, and/or override the power saving measures implemented by the display panel controller 130.

Thus, the example display panel controller 130 of FIG. 1 analyzes image data generated by the image sensor(s) 114 of the user device 104 with respect to a presence and attentiveness of the user 106 relative to the display screen 108. The example display panel controller 130 manages power consumed by the display panel 102 by controlling operational state(s) of the backlight 110 and/or the panel electronics 112 based on the presence of the user 106 within the imaging FoV 116 and the display FoV 132. Further, the display panel controller 130 adjusts the backlight 110 based on the gaze of the user 106 and whether or not the display screen 108 is within the user's field of view 138 (e.g., based on the orientation of the user's head relative of the image sensor(s) 114).

In some examples, the display panel controller 130 selectively adjusts the power consumption of the display panel 102 based on data from one or more ambient light sensor(s) 144 of the user device 104. The ambient light sensor(s) 144 of FIG. 1 measure illuminance and generate data indicative of light (e.g., intensity) in the surrounding environment in which the user device 104 is located. In the example of FIG. 1, if data from the ambient light sensor(s) 144 indicates that the room is dark or dimly lit, the display panel controller 130 instructs the backlight 110 to gradually dim or increase brightness to account for an increased sensitivity of the user 106 to changes in brightness in a dark environment (e.g., to prevent an impression that the display is flickering).

In some examples, the display panel controller 130 further reduces power consumption by the user device 104 based on data from the user input detection sensor(s) 113 indicating that the user 106 is actively engaged with the user device 104 (e.g., typing on a keyboard). In such examples, the display panel controller 130 saves power costs by instructing the image sensor(s) 114 not to generate image data and/or by refraining from analyzing image data with respect to the user's gaze, as the user inputs indicate that the user is currently present and attentive to the user device 104.

Figure 2:
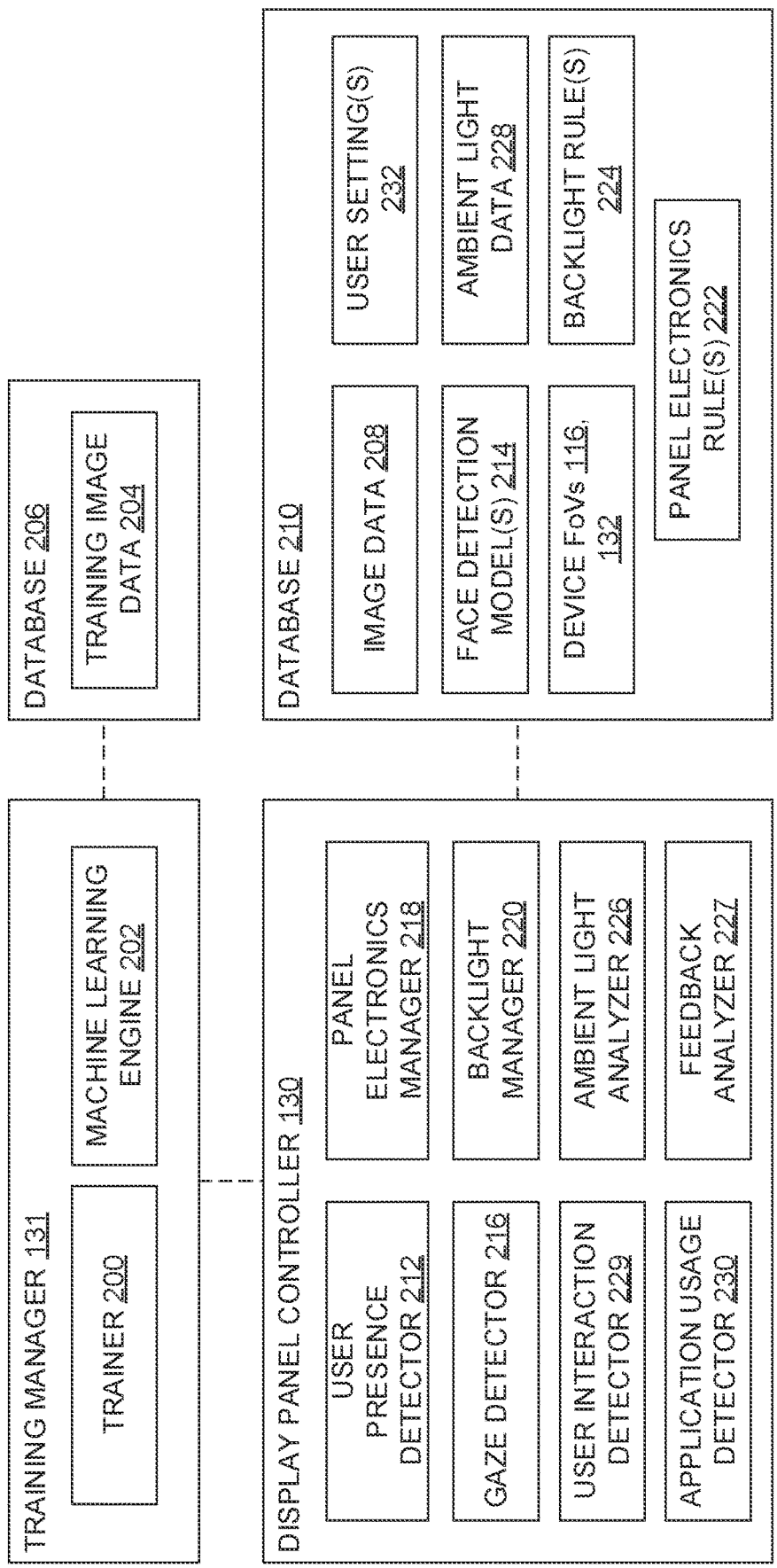
FIG. 2 is a block diagram of an example implementation of the training manager and display panel controller of FIG. 1.

FIG. 2 is a block diagram of an example implementation of the training manager 131 and the display panel controller 130 of FIG. 1. The training manager 131 of this example includes a trainer 200 and a machine learning engine 202. The trainer 200 trains the machine learning engine 202 using training image data 204 (e.g., via supervised learning) to generate one or more model(s) that are used by the display panel controller 130 to identify faces and/or facial features of a user of the user device 104. The training image data 204 can include historical image data for the user 106 and/or other subjects. In some examples, the training image data includes image data for a particular user 106 if the display panel controller 130 is to control (e.g., turn on) the display panel 102 based on detection of the particular user 106 as part of, for instance, a security user access policy for the user device 104. In other examples, the training image data 204 can include image data for a plurality of human subjects. In the example of FIG. 2, the training image data 204 is stored in a database 206. In some examples, the training manager 131 includes the database 206. In other examples, the database 206 is located external to the training manager 131 in a location accessible to the training manager 131 as shown in FIG. 2.

As mentioned above, the example display panel controller 130 is constructed to manage power consumption by a display panel (e.g., the display panel 102 of FIG. 1) of a user device (e.g., the user device 104 of FIG. 1) by adjusting operation of one or more of a backlight (e.g., the backlight 110 of FIG. 1) and panel electronics (e.g., the panel electronics 112 of FIG. 1) of the display panel based on user presence and attentiveness relative to a display screen (e.g., the display screen 108 of FIG. 1) of the user device. The display panel controller 130 receives image data 208 from the image sensor(s) 114 (e.g., a front-facing camera) of the user device 104 of FIG. 1. The image data 208 represents objects within the example imaging FoV 116 of the image sensor(s) 114 shown in FIG. 1. As mentioned above, the image sensor(s) 114 of FIG. 1 are always-on sensors and, thus, can generate image data when the user device 104 is in a powered-on state, including a sleep mode. The image sensor(s) 114 can generate the image data 208, which may be low resolution image data, at a rate of, for instance, 10 frames per second.

The image data 208 is stored in a database 210. In some examples, the display panel controller 130 includes the database 210. In other examples, the database 210 is located external to the display panel controller 130 in a location accessible to the display panel controller 130 as shown in FIG. 2. The databases 206, 210 of FIG. 2 may be the same storage device or different storage devices.

The example database 210 of FIG. 2 stores data regarding the imaging FoV 116 and the display FoV 132. Data regarding the imaging FoV 116 and the display FoV 132 can be provided via user input(s) based on, for instance, manufacturing specifications for the image sensor(s) 114 and the display screen 108 (e.g., viewing angle, field of view, etc.).

The example display panel controller 130 of FIG. 2 includes a user presence detector 212. The user presence detector 212 analyzes the image data 208 using machine learning model(s) generated during training by the trainer 200. The machine learning model(s) include face detection model(s) 214. In the example of FIG. 1, the face detection model(s) 214 are stored in the database 210. The user presence detector 212 uses the face detection model(s) 214 to identify a presence of a user face in the imaging FoV 116.

The example display panel controller 130 of FIG. 2 includes a gaze detector 216. In the example of FIG. 2, if the user presence detector 212 determines that the user 106 is present in the imaging FoV 116, the user presence detector 212 instructs the gaze detector 216 to analyze the image data 208 to determine if the user 106 is present in the display FoV 132. If the user presence detector 212 determines that the user 106 is not in the imaging FoV 116, the user presence detector 212 refrains from instructing the gaze detector 216 to analyze the image data 208 to reduce power consumption, as the user presence detector 212 has already determined that the user 106 is not present relative to the user device 104 of FIG. 1.

The example gaze detector 216 analyzes the image data 208 using the face detection model(s) 214 to determine if the user 106 is present in the display FoV 132. If the gaze detector 216 determines that the user 106 is in the display FoV 132, the gaze detector analyzes the facial features of the user 106 in the image data 208 using the face detection model(s) 214 to determine the position of the user 106 within the display FoV 132, an angle of the user's gaze relative to the image sensor(s) 114 and, thus, the user's field of view 138. For example, the gaze detector 216 identifies facial feature(s) such as a mouth, nose, eye(s), and ear(s) of the user 106 in the image data 208 to determine whether the user 106 is facing the image sensor(s) 114, looking at an angle relative to the image sensor(s) 114, or facing opposite of the image sensor(s) 114. Based on the angle of the user's face relative to the image sensor(s) 114, the gaze detector 216 determines whether the user is attentive or non-attentive to the display screen 108. For example, if the gaze detector 216 determines that the user 106 is facing the image sensor(s) 114 and, thus, the display screen is within the user's field of view, the gaze detector 216 determines that the user 106 is attentive to the display screen 108. If the gaze detector 216 detects that a face of the user 106 is at an angle relative to the image sensor(s) 114 and, thus, the display screen 108 is partially removed from the user's field of view, the gaze detector 216 determines that the user is non-attentive with respect to the display screen 108. In some examples, the gaze detector 216 verifies that the display screen 108 is not in the user's field of view or at least partially in the user's field of view based on the position of the user within the display FoV 132 (e.g., using x-y coordinates).

The example display panel controller 130 of FIG. 2 includes panel electronics manager 218. The panel electronics manager 218 generates instruction(s) that are transmitted to the panel electronics 112 of the display panel 102 of FIG. 1 to control operation of the panel electronics 112 of the display panel 102. The panel electronics manager 218 transmits the instruction(s) to the panel electronics 112 via one or more wired or wireless connections. The example display panel controller 130 of FIG. 2 includes a backlight manager 220. The backlight manager 220 generates instruction(s) to control operation of backlight 110 of the display panel 102 of FIG. 1. The backlight manager 220 transmits the instruction(s) to the backlight 110 via one or more wired or wireless connections. In the example of FIG. 2, the user presence detector 212 and the gaze detector 216 communicate with the panel electronics manager 218 and the backlight manager 220 to control operation of the display panel 102 based on a presence and attentiveness of the user 106 with respect to the user device 104.

In the example of FIG. 1, if the user presence detector 212 determines that the user 106 is present in the in imaging FoV 116, the user presence detector 212 sends a first message to the panel electronics manager 218 indicating that the user is present. If the user presence detector 212 determines that the user 106 is not present in the in imaging FoV 116, the user presence detector 212 sends a second message to the panel electronics manager 218 indicating that the user is not present. The first and second messages can include metadata (e.g., "1" for present and "0" for not present) in lieu of the actual image data to reduce power usage by the display panel controller 130 in managing the display panel 102.

The panel electronics manager 218 generates and transmits the instruction(s) for the panel electronics 112 based on the message(s) received from the user presence detector 212 and one or more panel electronics rules 222. The panel electronics rule(s) 222 are stored in the database 210. The panel electronics rule(s) 222 define operational states (e.g., on or off) for the panel electronics 112 based on the presence or absence of the user 106 in the imaging FoV 116. For example, the panel electronics rule(s) 222 can state that when the user 106 is present in the imaging FoV 116, the panel electronics 112 are to be turned on and when the user 106 is not present in the imaging FoV 116, the panel electronics 112 are to be turned off. The panel electronics rule(s) 222 can be defined based on or more user inputs.

As disclosed above, operation of the backlight 110 is controlled based on the presence of the user 106 within the display FoV 132 and, in particular, the gaze of the user 106 relative to the imaging sensor(s) 114. In the example of FIG. 2, if the gaze detector 216 determines that the user is present in the display FoV 132 and attentive, the gaze detector 216 sends a first message to the backlight manager 220 indicating that the user 106 is engaged. If the gaze detector 216 determines that the user 106 is present in the display FoV 132 but not attentive, the gaze detector 216 sends a second message to the backlight manager 220 indicating that the user 106 is disengaged or, put another way, that the display screen is at least partially removed from the user's field of view. The message(s) sent from the gaze detector 216 can include an indication of a direction of the gaze of the user 106 relative to the image sensor(s) 114 (e.g., facing directly toward the image sensor(s) 114, facing to the left of the image sensor(s) 114, facing opposite the image sensor(s) 114, etc.).

The backlight manager 220 generates and transmits the instruction(s) for the backlight 110 based on the message(s) received from the gaze detector 216 with respect to the user's gaze and one or more backlight rules 224. The backlight rule(s) 224, which are stored in the database 210, define a brightness level (e.g., lumen measurement) to be output by the backlight 110 based on the user's gaze relative to the image sensor(s) 114, as indicated by the angle of the face of the user 106 relative to the image sensor(s) 114 and the corresponding user field of view 138.

For example, the backlight rule(s) 224 can state if the panel electronics 112 are turned off (e.g., as when the user 106 is not present), the backlight 110 should be turned off. The backlight rule(s) 224 can state that if the panel electronics 112 are turned on, the backlight 110 should be turned on, but a brightness of the backlight 110 should be adjusted based on the user's gaze relative to the image sensor(s). For instance, the backlight rule(s) 224 can state that if the user's gaze is facing the image sensor(s) 114, a brightness of the backlight 110 should be adjusted to a default brightness setting. The backlight rule(s) 224 can state that if the user's gaze is angled 30°-45° away from the image sensor(s) 114 (i.e., the user FoV 138 is directed to the right or left of the electronic device), the brightness of the backlight 110 should be decreased to 90% of the default brightness. The backlight rule(s) 224 can state that if the user's gaze is at an angle of 45°-90° relative to the image sensor(s) 114, the brightness of the backlight 110 should be decreased to 50% of the default brightness. The backlight rule(s) 224 can state that if the user's gaze is directed 180° away from the image sensor(s) 114, the backlight 110 can be turned off because the display screen 108 is not in the user's field of view. The backlight rule(s) 224 can define different degrees of granularity with respect to brightness of the backlight 110 and the direction of the user's gaze.

In some examples, the backlight rule(s) 224 define brightness of the backlight 110 based on data indicative of ambient lighting in the environment in which the user device 104 is located. The example display panel controller 130 includes an ambient light analyzer 226 to analyze ambient light data 228 collected by the ambient light sensor(s) 144 with respect to a brightness of the surrounding environment. Based on the analysis of the ambient light data 228, the backlight manager 220 implements backlight rule(s) 224 that define a rate at which the backlight 110 should be dimmed or brightened to account for, for instance, an increased sensitivity of the user 106 to changes in brightness in a dark environment.

In the example of FIG. 2, the user presence detector 212 and the gaze detector 216 continue to analyze the image data 208 generated by the image sensor(s) 114 over time. If the gaze detector 216 determines that a direction of the user's gaze is changing based on the image data 208 collected at two or more time periods (e.g., the user's face is turning toward or away from the image sensor(s) 114), the backlight manager 220 implements backlight rules(s) 224 defining a rate at which the backlight 110 should be dimmed or brightened as the direction of the user's gaze changes and the display screen enters or leaves the user's field of view. For example, the backlight rule(s) 224 can state that the backlight 110 should brighten more quickly if the user 106 is turning toward the image sensor(s) 114 from an initial angle of 60° away from the sensor(s) 114 than from a position in which the user was facing 180° away from the image sensor(s) 114. Such rule(s) account for an amount of time for the display screen 108 to enter the user's field of view as the direction of the user's gaze changes.

The example display panel controller 130 of FIG. 2 includes a feedback analyzer 227. The example feedback analyzer 227 analyzes pattern(s) and/or trend(s) with respect to user behavior to refine the backlight rule(s) 224. For instance, the feedback analyzer 227 analyzes an amount of time for the user 106 to change a direction or his or her gaze toward or away from the image sensor(s) 114 to adjust the backlight rule(s) 224 defining the rate at which the backlight 110 should be dimmed or brightened. In some examples, the feedback analyzer 227 adjusts the panel electronics rule(s) 222 and/or the backlight rule(s) 224 based on user setting(s) 232. The user setting(s) 232 can define user preferences with respect to brightness levels for the backlight 110, changes in brightness when the user 106 looks away from the image sensor(s) 114, etc. In some examples, the feedback analyzer 227 communicates with the trainer 200 of the training manager 131 to refine the face detection model(s) 214 based on the image data 208 including the user 106 collected by the image sensor(s) 114 during operation of the user device 104.

In some examples, the display panel controller 130 of FIG. 2 implements additional power-saving measures to supplement the power management of the display panel 102. For instance, in some examples, the image data 208 is temporarily stored in the database 210 and deleted after the analysis of the image data by the user presence detector 212 and the gaze detector 216. In some examples, the image data 208 collected at a first time is overwritten with new image data 208 collected at a later time. The temporary storage of the image data 208 conserves storage resources as the display panel controller 130 operates in a low power mode.

As another example, the display panel controller 130 of FIG. 2 includes a user interaction detector 229 to analyze data generated by the user input detection sensor(s) 113 of FIG. 1 indicative of user interaction with the user device 104 (e.g., keyboard). In the example of FIG. 2, if the user interaction detector 229 determines that the user 106 is interacting with the user device 104, the panel electronics manager 218 instructs the panel electronics 112 to a powered-on state and the backlight manager 220 instructs the backlight 110 to operate at a default brightness setting. In some such examples, the user interaction detector 229 instructs the user presence detector 212 and the gaze detector 216 to refrain from analyzing image data 208 because the user 106 is present and engaged with the user device 104. In some such examples, the user interaction detector 229 instructs the image sensor(s) 114 to refrain from generating image data 208 to conserve power while the user 106 is engaged with the user device 104. In such examples, the image sensor(s) 114 may still generate image data in connection with other application(s) 107 installed on the user device 104, such as a video conferencing application.

In some examples, in addition to managing operation of the backlight 110 and the panel electronics 112, the display panel controller 130 provides for additional power savings at the user device 104. The example display panel controller 130 includes an application usage detector 230. The application usage detector 230 determines if any application(s) 107 installed on the user device 104 of FIG. 1 are in operation when the user 106 is present at the user device 104 but is not attentive to the display screen 108. In such examples, the application usage detector 230 triggers a full-screen graphic to be displayed via the display screen 108, thereby causing the other application(s) 107 to be treated as background window(s) by the processor 109 of the user device 104. When the application(s) 107 are treated as background window(s), activity related to rendering of image data associated with the application(s) 107 can be reduced.

While an example manner of implementing the training manager 131 of FIG. 1 is illustrated in FIG. 2, one or more of the elements, processes and/or devices illustrated in FIG. 2 may be combined, divided, re-arranged, omitted, eliminated and/or implemented in any other way. Further, the example trainer 200, the example machine learning engine 202, the example database 206, and/or, more generally, the example training manager 131 of FIG. 2 may be implemented by hardware, software, firmware and/or any combination of hardware, software and/or firmware. Thus, for example, any of the example trainer 200, the example machine learning engine 202, the example database 206, and/or, more generally, the example training manager 131 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example trainer 200, the example machine learning engine 202, and/or the example database 206 is/are hereby expressly defined to include a non-transitory computer readable storage device or storage disk such as a memory, a digital versatile disk (DVD), a compact disk (CD), a Blu-ray disk, etc. including the software and/or firmware. Further still, the example training manager 131 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the display panel controller 130 of FIG. 1 is illustrated in FIG. 2, one or more of the elements, processes and/or devices illustrated in FIG. 2 may be combined, divided, re-arranged, omitted, eliminated and/or implemented in any other way. Further, the example database 210, the example user presence detector 212, the example gaze detector 216, the example panel electronics manager 218, the example backlight manager 220, the example ambient light analyzer 226, the example feedback analyzer 227, the example user interaction detector 229, the example application usage detector 230, and/or, more generally, the example display panel controller 130 of FIG. 3 may be implemented by hardware, software, firmware and/or any combination of hardware, software and/or firmware. Thus, for example, any of the example database 210, the example user presence detector 212, the example gaze detector 216, the example panel electronics manager 218, the example backlight manager 220, the example ambient light analyzer 226, the example feedback analyzer 227, the example user interaction detector 229, the example application usage detector 230, and/or, more generally, the example display panel controller 130 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 210, the example user presence detector 212, the example gaze detector 216, the example panel electronics manager 218, the example backlight manager 220, the example ambient light analyzer 226, the example feedback analyzer 227, the example user interaction detector 229, and/or the example application usage detector 230 is/are hereby expressly defined to include a non-transitory computer readable storage device or storage disk such as a memory, a digital versatile disk (DVD), a compact disk (CD), a Blu-ray disk, etc. including the software and/or firmware. Further still, the example display panel controller 130 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figures 3, 4:
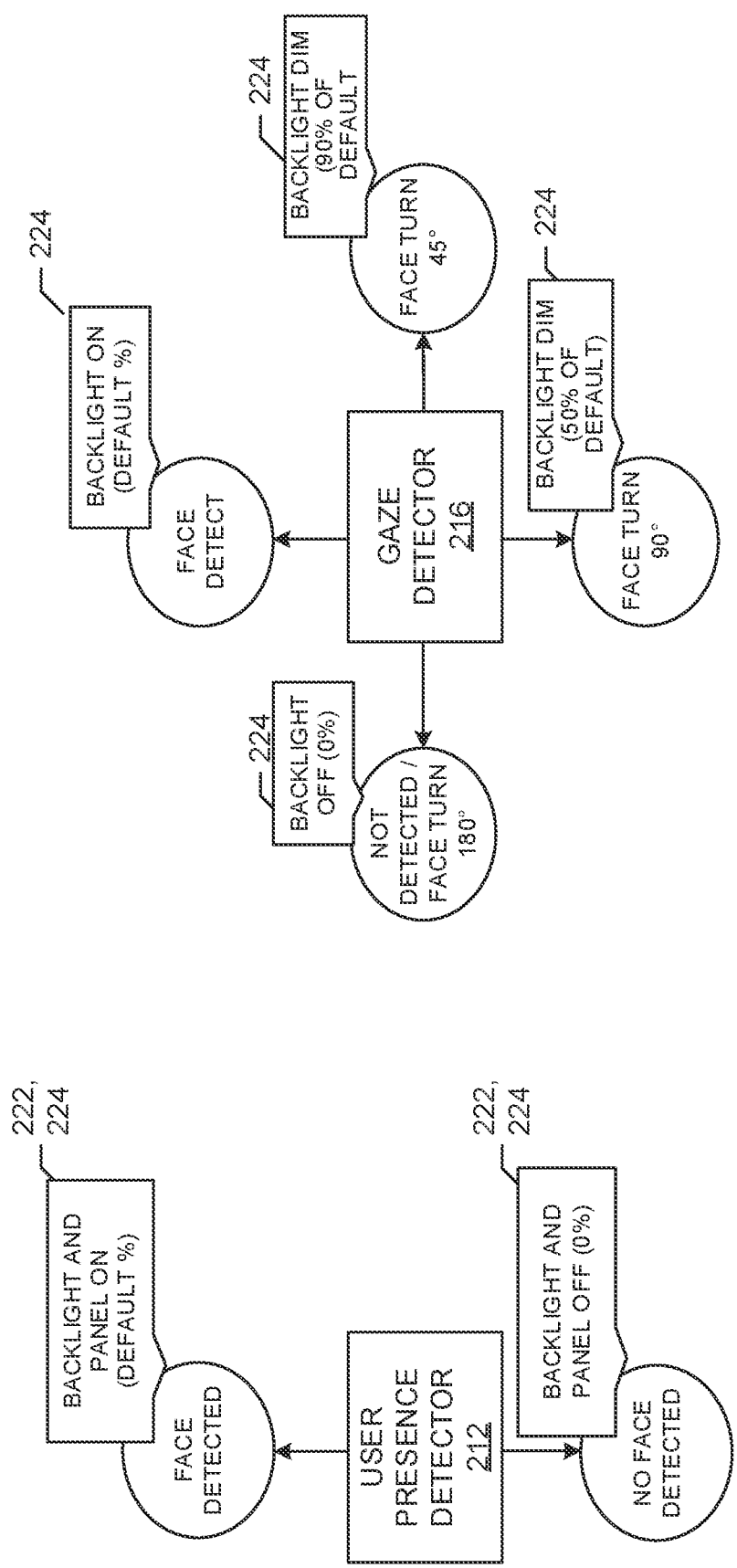
FIGS. 3 and 4 are diagrams of example display power management rules for execution by the example display panel controller of FIG. 1.

FIG. 3 depicts a graphical representation of the panel electronics rule(s) 222 and the backlight rule(s) 224 to be implemented by the panel electronics manager 218 and the backlight manager 220 of the example display panel controller 130 of FIG. 2 based on whether or not the user presence detector 212 of FIG. 2 detects a face in the imaging FoV 116 associated with the image sensor(s) 114. As illustrated in FIG. 3, when the user presence detector 212 detects a face in the imaging FoV 116, the example panel electronics rule(s) 222 indicate that the panel electronics 112 of the display panel 102 should be turned on. Also, the example backlight rule(s) 224 of FIG. 3 indicate that the backlight 110 of the display panel 102 should be turned on to, for instance, a default brightness setting in anticipation of the user 106 viewing the display screen 108. As also illustrated in FIG. 3, when the user presence detector 212 does not detect a face in the imaging FoV 116, the rule(s) 222, 224 indicate that the panel electronics 112 and the backlight 110 of the display panel 102 should be turned off.

FIG. 4 depicts a graphical representation of the backlight rule(s) 224 to be implemented by the backlight manager 220 of the example display panel controller 130 of FIG. 2 based on the direction of the user's gaze and, thus, the user's field of view, relative to the image sensor(s) 114 of the user device 104. As mentioned above, although the user 106 may be within the display FoV 132, there may be instances in which the user 106 is not attentive to the display screen 108. In such examples, the brightness of the backlight 110 can be adjusted for power savings.

As illustrated in FIG. 4, when the gaze detector 216 determines based on facial feature recognition of the image data 208 generated by the image sensor(s) 114 that the user's face is directed or substantially directed toward the imaging sensor(s) 114, the backlight rule(s) 224 indicate that the backlight 110 should be set to the default brightness setting. If, based on the facial feature analysis, the gaze detector 216 determines that the user's face is turned at angle relative to the image sensor(s) 114 (e.g., 45°, 90°), the backlight rule(s) 224 indicate that a brightness of the backlight 110 should be dimmed by a particular percentage (e.g., 90%, 50%) when the display screen 108 is out of or at least partially removed from the user's field of view. If the gaze detector 216 determines that the user's face is directed 180° opposite the imaging sensor(s) 114 (e.g., due to an absence of facial features such as a mouth or nose in the image data), the backlight rule(s) 224 indicate that the backlight 110 should be turned off.

FIG. 5 depicts a graph 500 showing changes in power states of the backlight 110 and the panel electronics 112 of the user device 104 (FIG. 1) over time based on attentiveness and presence of a user (e.g., the user 106). As shown in the graph 500 of FIG. 5, at time $t_1$ the display panel controller 130 of FIGS. 1 and 2 determines that the user is attentive based on, for example, the detection of user input(s) at the electronic device (e.g., via the user input detection sensor(s) 113 of FIG. 1). In some examples, the display panel controller 130 determines that the user is attentive based on a direction of a gaze of the user relative to the image sensor(s) 114 of FIGS. 1 and 2 (e.g., as determined based on the image data 208 and the face detection model(s) 214). Accordingly, at time $t_1$, the panel electronics manager 218 of the display panel controller 130 instructs the panel electronics 112 to be in powered-on state. Also, the backlight manager 220 instructs the instructs the backlight 110 to be in a powered-on state an to output light at, for instance, a default brightness level.

At time $t_2$, the display panel controller 130 of FIGS. 1 and 2 determines that the user is not attentive based on the direction of the user's gaze relative to the image sensor(s) 114 (e.g., as determined based on the image data 208 and the face detection model(s) 214). As such, the backlight manager 220 instructs the backlight 110 to decrease brightness. In the example of FIG. 5, the backlight manager 220 instructs the backlight 110 to gradually decrease brightness over the time period in which the user is determined to be inattentive based on, for example, the backlight rule(s) 224. The gradual reduction in brightness can prevent the dimming of the backlight 110 from distracting the user while, for instance, the user is sitting at his or her desk but not using the electronic device 102 as compared to if the backlight 110 turned off completely.

In the example of FIG. 5, at time $t_3$, the user presence detector 212 of the display panel controller 130 of FIGS. 1 and 2 determines that the user is not present based on the image data 208 and the face detection model(s) 214. As such, the panel electronics manager 218 instructs the panel electronics 112 to turn off. Also, the backlight manager 220 instructs the backlight 110 to turn off. As represented by line 502 in FIG. 5, which represents a time span of ten minutes, the example display panel controller 130 of FIGS. 1 and 2 reduces power consumption of the display panel 102 sooner than if the display panel 102 were not turned off until ten minutes of inactivity had passed based on a predefined timeout period for turning off the display panel and/or putting the user device to sleep.

Figure 6:
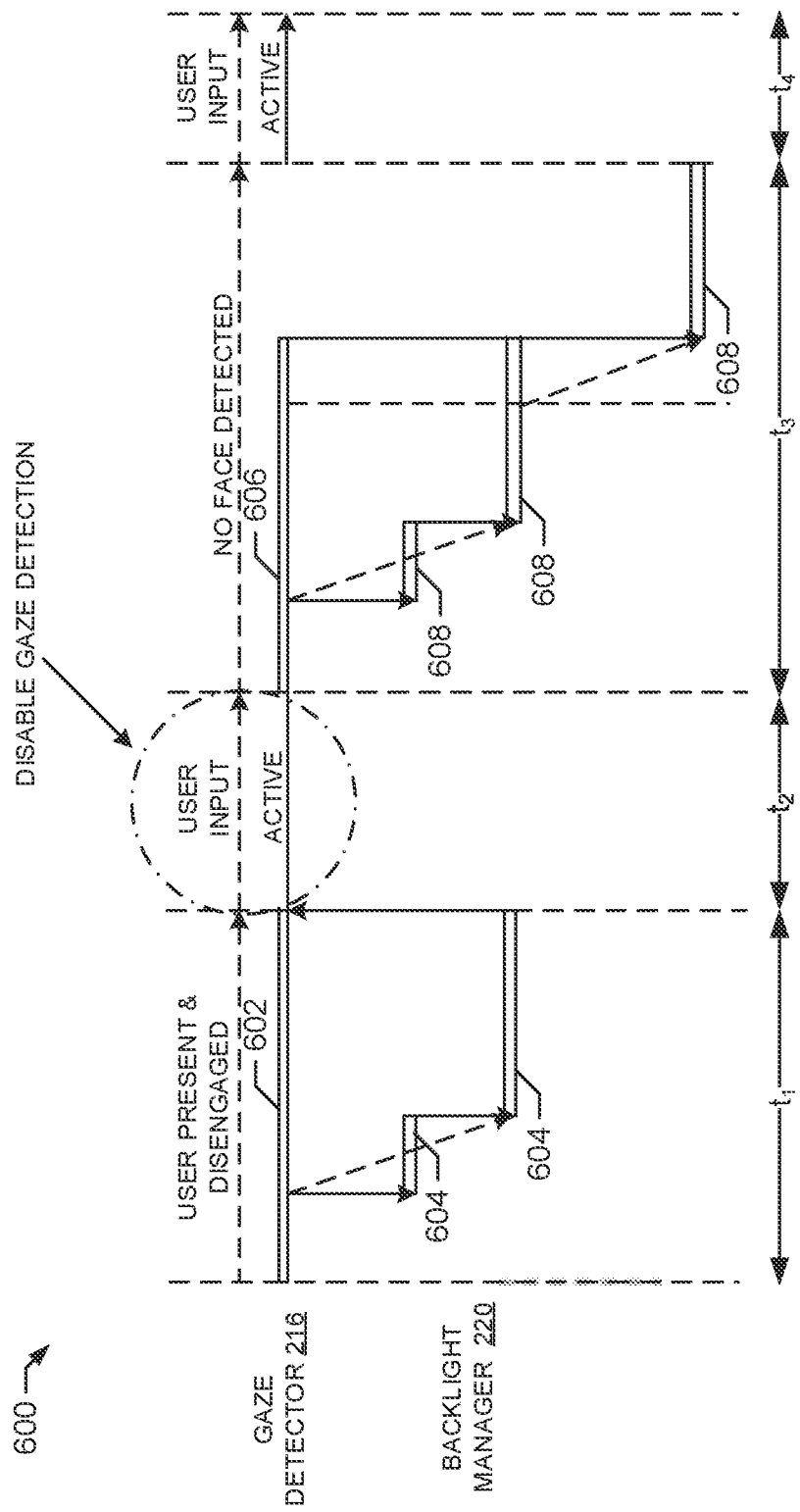
FIG. 6 is an example timeline showing control of a backlight of a display panel over time by the example display panel controller of FIG. 1.

FIG. 6 is an example timeline 600 illustrating control of the backlight 110 by the gaze detector 216 based on an analysis user interaction(s) with the user device 104 (FIG. 1). FIG. 6 also illustrates time periods in which the gaze detector 216 is actively analyzing the image data and, thus, consuming power (i.e., in addition to the power consumed by the display panel 102).

As shown in FIG. 6, during time period $t_1$, the gaze detector 216 determines that the user is disengaged or not attentive to the display screen 108 (e.g., based on the direction of the user's gaze relative to the image sensor(s) 114). During time period $t_1$, the gaze detector 216 of the display panel controller 130 consumes power to perform the analysis of the user's gaze, as represented by line 602 in FIG. 6. Also, the backlight manager 220 control a brightness of the backlight 110, as represented by lines 604 in FIG. 6.

At time period $t_2$, the user interaction detector 229 detects a user input(s) at the user device 104, such as a keyboard input. As shown in FIG. 6. the display panel controller 130 disables operation of the gaze detector 216 with respect to analyzing image data because the user input(s) indicate that the user is present and engaged with the user device 104. Also, the backlight 110 outputs light at a default brightness setting in view of the user interaction with the device. Accordingly, the backlight manager 220 does not adjust the brightness of the backlight 110 during time period $t_2$.

In the example of FIG. 6, when no user inputs are detected by the user interaction detector 229, the gaze detector 216 of the display panel controller 130 resumes analyzing the image data 208 to determine the attentiveness of the user and, thus, consumes power in performing the analysis as represented by line 606 of FIG. 6. For example, at time period $t_3$, the gaze detector 216 determines that the user's face is turning away from the display screen 108 (e.g., based on the user's gaze relative to the image sensor(s) 114). The backlight manager 220 resumes controlling the brightness of the backlight 110 in view of the gaze analysis performed by the gaze detector 216, as represented by lines 608 of FIG. 6. In the example of FIG. 6, when the gaze detector 216 determines that the user has as turned away from the image sensor(s) 114 (e.g., facing 180° away), the backlight manager 220 turns the backlight 110 off. In some such examples, the gaze detector 216 does not analyze image data when the backlight 110 is off until, for instance, the user presence detector 212 of FIG. 2 determines that the user is present within the imaging FoV 116.

In the example of FIG. 6, a user input is detected at time period $t_4$ and, thus, the gaze detector 216 refrains from analyzing image data. Thus, in the example of FIG. 6, the gaze detector 216 selectively analyzes the image data so as not to incur unnecessary energy costs when the user is known to be interacting with the user device 104 (e.g., as at time periods $t_2$ and $t_4$ in FIG. 6).

Figure 7:
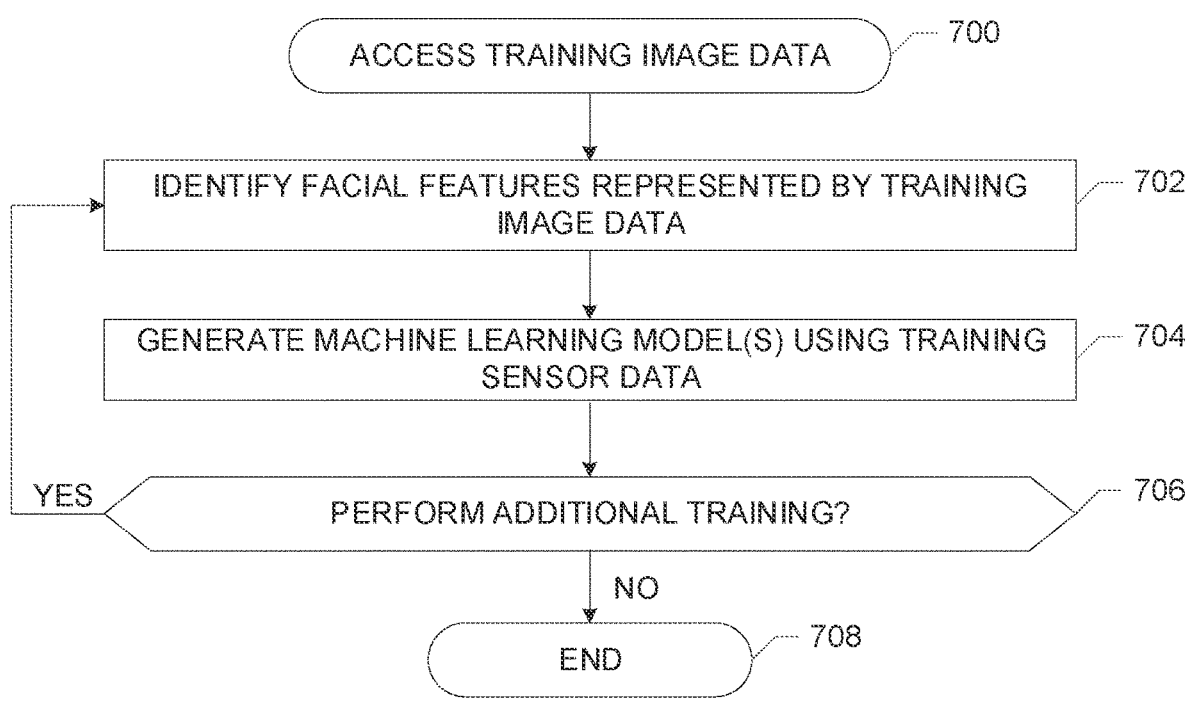
FIG. 7 is a flowchart representative of example machine readable instructions which may be executed to implement the example training manager of FIG. 2.
Figure 8A:
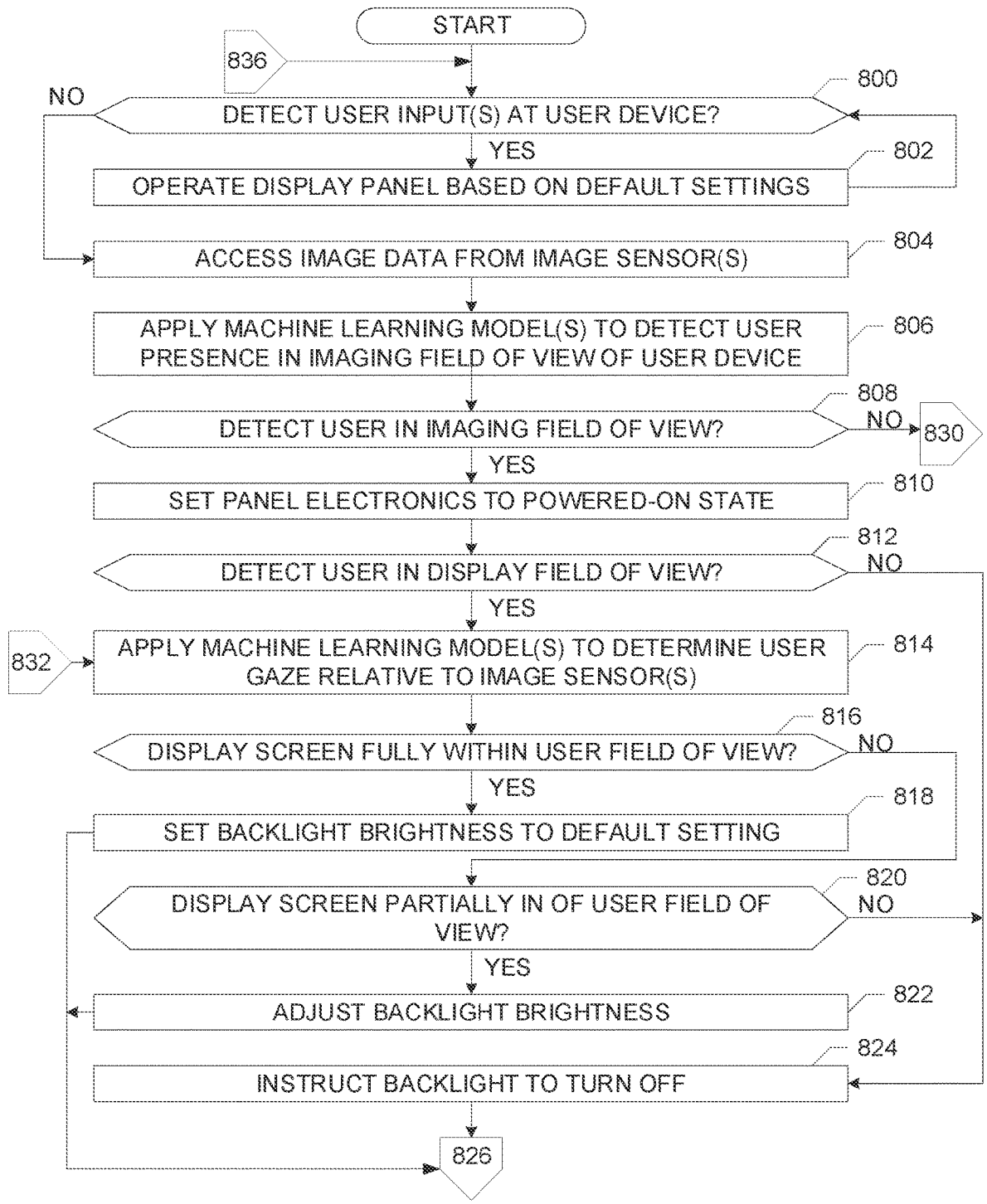
FIGS. 8A and 8B are flowcharts representative of example machine readable instructions which may be executed to implement the example display panel controller of FIG. 2.
Figure 8B:
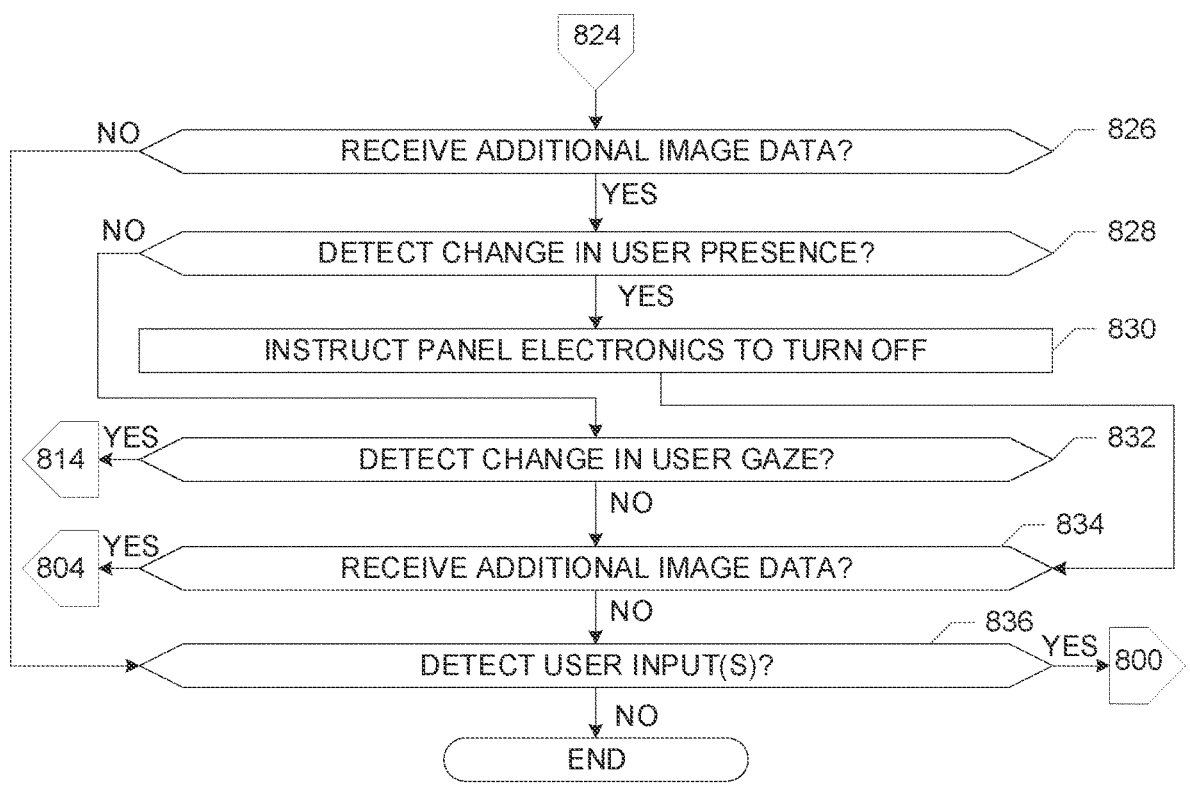

Flowcharts representative of example hardware logic, machine readable instructions, hardware implemented state machines, and/or any combination thereof for implementing the example training manager 131 and/or the example display panel controller 130 are shown in FIGS. 7 and 8A-8B. The machine readable instructions may be an executable program or portion of an executable program for execution by a computer processor such as the processor(s) 130, 131 shown in the example processor platform(s) 1300, 1400 discussed below in connection with FIGS. 13 and 14. The program may be embodied in software stored on a non-transitory computer readable storage medium such as a CD-ROM, a floppy disk, a hard drive, a DVD, a Blu-ray disk, or a memory associated with the processor(s) 130, 131, but the entire program and/or parts thereof could alternatively be executed by a device other than the processor(s) 130, 131 and/or embodied in firmware or dedicated hardware. Further, although the example program is described with reference to the flowcharts illustrated in FIGS. 7 and 8A-8B, many other methods of implementing the example training manager 131 and/or the example display panel controller 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7 and 8A-8B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 7 is a flowchart of example machine readable instructions that, when executed, implement the example training manager 131 of FIGS. 1 and/or 2. In the example of FIG. 7, the training manager 131 trains the example display panel controller 130 of FIGS. 1 and/or 2 using training image data, which is generated for one or more users who may or may not be using the example user device 104 of FIG. 1. As discussed herein, the training manager 131 generates machine learning models that are used by the display panel controller 130 of FIGS. 1 and/or 2 to control the backlight 110 and the panel electronics 112 based on user presence and attentiveness relative to the user device 104.

The example instructions of FIG. 7 can be executed by one or more processors of, for instance, the user device 104, another user device, and/or a cloud-based device. The instructions of FIG. 7 can be executed in substantially real-time as the training image data received by the training manager 131 or at some time after the training sensor data is received by the training manager 131. The training manager 131 can communicate with the display panel controller 130 via one or more wired or wireless communication protocols.

The example trainer 200 of FIG. 2 accesses training image data 204 (block 700). The training image data 204 can be stored in the database 206. In some examples, the training image data 204 is generated for one or more users of the user device 104. In some such examples, the training image data 204 can be received from the display panel controller 130 (e.g., via the feedback analyzer 227) and/or directly from the image sensor(s) 114 of the user device 104. In some other examples, the training image data 204 is generated for users who are not user(s) of the user device 104.

The example trainer 200 of FIG. 2 identifies user facial features represented by the training image data 204 (block 702). As example, based on the training image data 204, the trainer 200 identifies facial features such as the nose, ears, mouth, forehead, etc.

The example trainer 200 of FIG. 2 generates one more face detection model(s) 214 via the machine learning engine 202 and based on the training image data 204 defining user presence and/or attentiveness based on detected facial features (block 704). For example, the trainer 200 uses the training image data 204 to generate the face detection model(s) 214 that are used by the display panel controller 130 to determine whether a user is present in the imaging FoV 116 or the display FoV 132.

The example trainer 200 can continue train the display panel controller 130 using different datasets and/or datasets having different levels of specificity (block 706). For example, the trainer 200 can generate a first face detection model 214 to determine if the user is present in the imaging FoV 116 and a second face detection model 214 to determine if the user's face is turned to the right or left of the image sensor(s) 114. The example instructions end when there is no additional training to be performed (e.g., based on user input(s)) (block 708).

FIGS. 8A and 8B include a flowchart of example machine readable instructions that, when executed by a processor, implement the example display panel controller 130 of FIGS. 1 and/or 2. In the example of FIGS. 8A and 8B, the display panel controller 130 generates instruction(s) to control the panel electronics 112 and the backlight 110 of the display panel 102 based on a presence of a user (e.g., the user 106) and a gaze of the user relative to image sensor(s) (e.g., the image sensor(s) 114) of a user device (e.g., the user device 104). The example instructions of FIGS. 8A and 8B can be executed by one or more processors of, for instance, the user device 104, another user device, and/or a cloud-based device. As mentioned above, in some examples, at least some of the instructions of FIGS. 8A and 8B are executed by a processor operating in a low power mode, such as a digital signal processor, to reduce power consumption in processing and analyzing the image data. The instructions of FIGS. 8A and 8B can be executed in substantially real-time as the image sensor(s) 114 generate image data and/or as a user interacts with the user device 104.

The example user interaction detector 229 determines whether the user is interacting with the user device 104 (block 800). For example, the user interaction detector 229 detects user input(s) at the user device 104 such as keyboard input(s), touch screen input(s), mouse click(s), etc. In the example of FIGS. 8A and 8B, if the user interaction detector 229 determines that the user is interacting with the user device 104, the panel electronics manager 218 instructs the panel electronics 112 of the display panel 102 to a powered-on state and the backlight manager 220 instructs the backlight 110 of the display panel 102 to operate at a default brightness setting (e.g., a brightness level predefined by a manufacturer or the user) (block 802).

If the user is not interacting with the user device, the user presence detector 212 accesses image data 208 generated by the image sensor(s) 114 of the user device 104 (block 804). The example user presence detector 212 determines whether a user is present within the imaging field of view (FoV) 116 associate with the image sensor(s) 114 based on the image data 208 generated by the image sensor(s) 114 and the machine learning model(s) 214 (e.g., the face detection model(s)) generated by the training manager 131 of FIGS. 1 and 2 (block 806). The example user presence detector 212 determines if the user is present based on the identification of a face of the user in the imaging FoV 116.

If the user the user is present within the imaging FoV 116 (block 808), the panel electronics manager 218 generates and transmits instruction(s) for the panel electronics to be powered on (block 810). In some examples, the panel electronics manager 218 instructs the panel electronics 112 to maintain a powered on state if the panel electronics are already turned on. In some other examples, the panel electronics manager 218 instructs the panel electronics 112 to move from a powered-off state to a powered-on state.

In the example of FIGS. 8A and 8B, if the user presence detector 212 determines that the user is in the imaging FoV 116, the gaze detector 216 determines whether the user is in the display FoV 132 (e.g., as defined based on an intended viewing distance of the user from the display screen 108 of the user device 104 and a viewing angle of the display screen 108) (block 812). The gaze detector 216 can determine whether the user is in the display FoV 132 based on the image data 208 and the location of the user in the image data 208 relative to the display FoV 132 (e.g., x-y coordinates).

If the user is in the display FoV 132, the gaze detector 216 applies the machine learning model(s) 214 (e.g., the face detection model(s)) to determine a position of the user's gaze relative to the image sensor(s) 114 (block 814). The gaze detector 216 uses the model(s) 214 to analyze the image data 208 with respect to an angle of the user's face relative to the image sensor(s) 114. For example, if the gaze detector 216 identifies only one ear in the image data, the gaze detector 216 determines that the user is looking away from the display screen 108.

Based on the analysis of the image data with respect to the user's gaze relative to the image sensor(s) 114, the gaze detector 216 determines if the display screen 108 is fully in a field of view 138 of the user (block 816). In the example of FIGS. 8A and 8B, if the gaze detector 216 determines that the display screen 108 is within the user's field of view 138, the backlight manager 220 of FIG. 2 instructs the backlight 110 to operate at a default brightness setting in anticipation that the user is looking at the display screen 108 or about to look at the display screen 108 in view the user's gaze relative to the image sensor(s) 114 (block 818). The backlight manager 220 generates the instructions for the backlight 110 based on the backlight rule(s) 224 stored in the database 210.

In the example of FIGS. 8A and 8B, if instead the gaze detector 216 determines that the display screen 108 is partially in the user field of view (block 820), the backlight manager 220 of FIG. 2 generates instruction(s) to adjust a brightness of the backlight 110 (block 822). For example, based on the backlight rule(s) 224 and an angle of the user's face relative to the image sensor(s) 114 as determined by the gaze detector 216, the backlight manager 220 instructs the backlight 110 to dim or decrease in brightness.

In the example of FIGS. 8A and 8B, if the gaze detector 216 determines that the display screen 108 is not at least partially in the user's field of view 138, the backlight manager 220 instructs the backlight 110 to turn off (block 824). Thus, the backlight manager 220 conserves power by reducing a brightness of the backlight 110 or turning off the backlight 110 based on the direction of the user's gaze and corresponding field of view.

The example user presence detector 212 and the gaze detector 216 continue to analyze image data 208 received from the image sensor(s) 114 with respect to user presence and attentiveness (blocks 828, 832). If the user presence detector 212 determines, based on the image data and the face detection model(s) 214, that the user is not present in the imagining FoV 116 (blocks 808, 828), the panel electronics manager 218 instructs the panel electronics 112 to turn off to conserve power when the user is not present (block 830). The instructions of FIGS. 8A and 8B end when no further image data is received by the display panel controller 130 and no user input(s) are detected at the user device 104 (blocks 834, 836).

Examples disclosed above in connection with FIGS. 1-8B provide for automatic adjustment of a brightness of the backlight 110 of the display panel 102 of the example user device 104 based on a direction of a gaze of a user of the user device 104 and the corresponding field of view of the user. As disclosed above, the brightness of the backlight 110 can increase or decrease as the display screen 108 enter or leaves the user's field of view. In some other examples, a brightness of a backlight for a display screen of a user device such as a smartphone is automatically adjusted based on ambient light in the environment in which the user device is located. The user device can include ambient light sensor(s) (e.g., the ambient light sensor(s) 144 of the user device 104 of FIG. 1) to generate data indicative of light levels (e.g. intensity) in the environment. The brightness of the backlight can be adjusted based on changes in the ambient light data as, for instance, the user carries the user device between different environments. For example, a brightness of the backlight of the display screen may be adjusted as the user moves from a brightly lit environment (e.g., a sunlit room) to a darker environment (e.g., a dimly lit hallway).

In some such examples, the user manually adjusts a brightness of the backlight based on the environment in which the user is located and, thus, may override or turn off the auto-brightness settings of the device. For instance, if a user carries the user device from a room that is brightly lit to a dark room, the user may consider the backlight of the display screen to be too bright in the dark room, even if the brightness of the backlight has been automatically reduced based on the ambient light sensor data. In such instances, the user may turn off the auto-brightness setting and manually set the backlight brightness so that the display screen appears dark or dimmed. However, if the user then moves with the user device from the dark environment to brighter environment, the backlight of the display screen remains off or dimly lit because the auto-brightness setting of the user device was previously turned off by the user. As such, the user may have difficulty viewing the display screen in the brighter environment.

Figure 9:
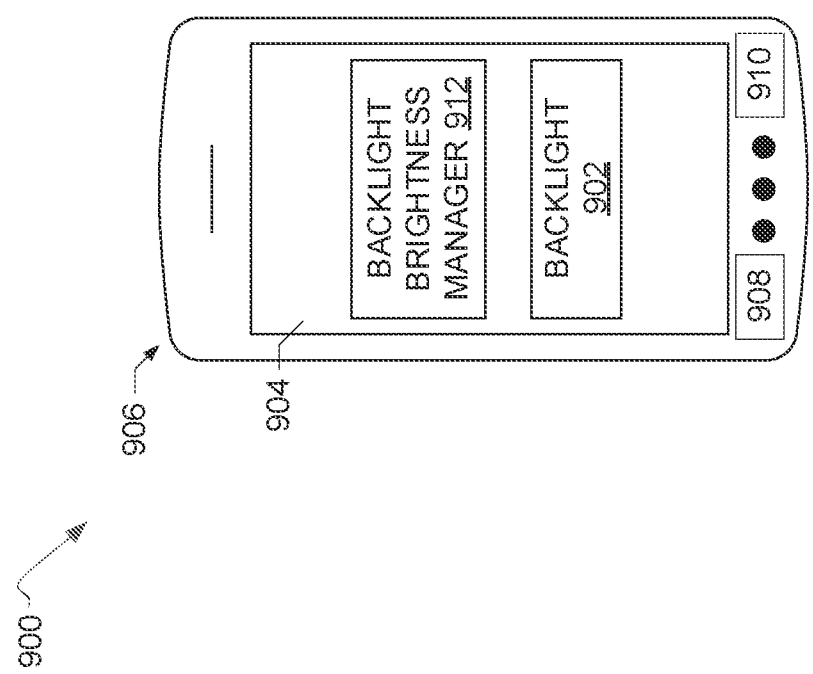
FIG. 9 illustrates another example system constructed in accordance with teachings of this disclosure and including an example backlight brightness manager for controlling brightness of a backlight of a user device.

FIG. 9 illustrates an example system 900 constructed in accordance with teachings of this disclosure for controlling brightness of a backlight 902 associated with a display screen 904 of a user device 906 in response to changes in ambient light after a user has manually adjusted a brightness setting of the backlight 902. The user device 906 can include a laptop, a tablet, a smart phone, a personal computer, etc. The user device 906 includes a processor 908 to execute, for instance, application(s) that are accessed by the user via the user device 906. The example user device 906 includes ambient light sensor(s) 910. The ambient light sensor(s) 910 of FIG. 9 generate data indicative of a level of light in an environment in which the user device 906 is located (e.g., illuminance).

In the example system 900 of FIG. 9, the ambient light data generated by the ambient light sensor(s) 910 is processed by a backlight brightness manager 912. The backlight brightness manager 912 serves to process the ambient light data generated by the ambient light sensor(s) 910 to determine a brightness (e.g., lumen level) of the backlight 902. The example backlight brightness manager 912 can be implemented by the processor 908 of the user device 906. In other examples, the display panel controller 130 is implemented by one or more cloud-based devices, such as one or more servers, processors, and/or virtual machines located remotely from the user device 906. In other examples, some of the analysis performed by the backlight brightness manager 912 is implemented by cloud-based devices and other parts of the analysis are implemented by local processor(s) or one or more user device For example, if the backlight brightness manager 912 determines that the user device 906 is in brightly lit room based on the ambient light data, the backlight brightness manager 912 increases a brightness of the backlight 110 to improve an ability of the user to view content on the display screen 904. If the backlight brightness manager 912 determines that the user device is in dimly lit or dark room, the backlight brightness manager 912 reduces a brightness of the backlight 902 to prevent the backlight from causing discomfort to the user's eyes.

In the example of FIG. 9, the user can manually adjust the brightness settings of the backlight 110 by accessing, for instance, a backlight user setting application executed by the processor 908 and by providing one or more inputs at the user device 906 (e.g., via the display screen 904). For example, the user can reduce a brightness of the backlight 110, thereby overriding the brightness setting of the backlight 902 set by the backlight brightness manager 912 based on the ambient light sensor data.

In the example of FIG. 9, the backlight brightness manager 912 evaluates the user input(s) with respect to the brightness of the backlight 110 in view of the ambient light data generated by the ambient light sensor(s) 910 over time. Based on the analysis, the backlight brightness manager 912 determines whether the brightness of the backlight 902 should remain at the user-defined setting or if the brightness of the backlight 902 should be automatically adjusted in view of changes in ambient light levels. The change in ambient light levels can occur due to, for instance, the user moving between environments with the user device or due to changes within an environment (e.g., turning on a light in bedroom in the morning after the room has been dark overnight). In the example of FIG. 9, if the backlight brightness manager 912 determines that a change in ambient light levels has exceed a predefined threshold, the backlight brightness manager 912 automatically adjusts the brightness of the backlight 902 to facilitate ease of viewing the display screen 904. If the backlight brightness manager 912 determines that the change in ambient light levels has not exceeded the threshold, the backlight brightness manager 912 maintains the brightness of the backlight 912 at the user-defined (i.e., manual) setting.

For example, the backlight brightness manager 912 can detect that the user manually reduced the brightness of the backlight 902. If, based on the ambient light data generated by the ambient light sensor(s) 910, the backlight brightness manager 912 determines that the user device 106 has been moved from a dark environment to a bright environment, the backlight brightness manager 912 instructs the backlight 902 to increase in brightness, despite the previous user input for the brightness to be reduced. The backlight brightness manager 912 increases the brightness of the backlight 110 to assist the user in viewing the display screen 904 in the brighter environment, as the display screen may otherwise be too dark for the user to view in the brighter environment. In some examples, the backlight brightness manager 912 instructs the backlight 902 to output light at a brightness level that was output before the manual user adjustment. In other examples, the backlight brightness manager 912 determines a brightness of the backlight 902 based on current ambient light data associated with the environment in which the user device 906 is located.

Figure 10:
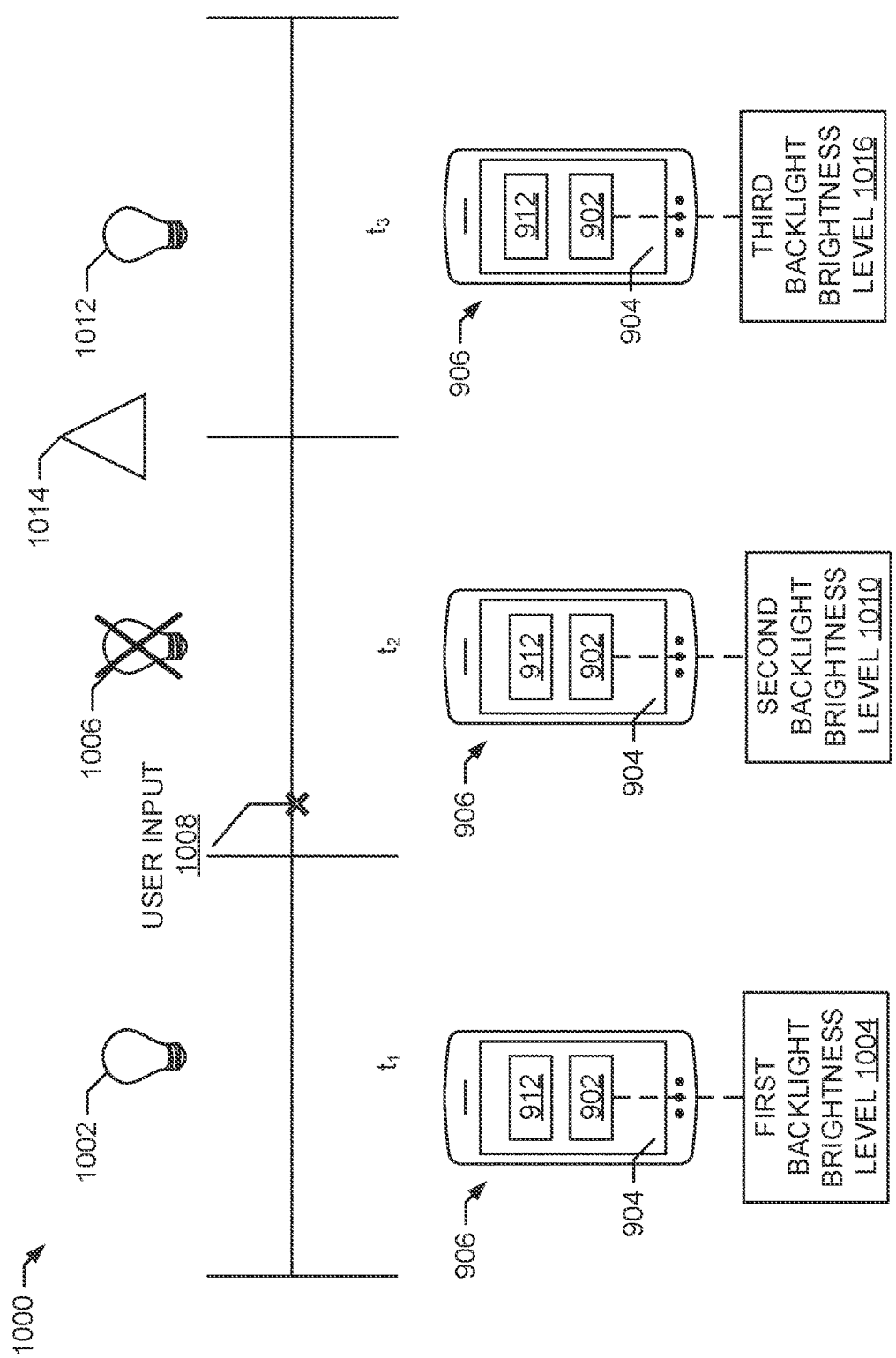
FIG. 10 illustrates an example timeline of adjustments to the brightness of a backlight by the example backlight brightness manager of FIG. 9.

FIG. 10 illustrates an example timeline 1000 showing changes in ambient light in one or more environments over time and corresponding changes in a brightness of the backlight 902 of the user device 906 of FIG. 9 in accordance with teachings of this disclosure. As shown in FIG. 10, at a first time period $t_1$, the user device 906 is located in an environment associated with a first ambient light level 1002. In the example of FIG. 10, the backlight 902 is set to a first backlight brightness level 1004. The first backlight brightness level 1004 can be defined by the backlight brightness manager 912 based on data from the ambient light sensor(s) 910 of FIG. 1. In some examples, the first brightness level 1004 is defined based on a user input.

At a second time period $t_2$, the user device 906 is in an environment associated with a second ambient light level 1006. In the example of FIG. 10, the second ambient light level 1006 is reduced as compared to the first light level 1002 of the environment of the first time period $t_1$ (i.e., the environment with the second ambient light level 1006 is darker than the environment with the first light level 1004). The dark environment can be a different environment than the environment of the first time period $t_1$ (e.g., a different room) or the same environment as the environment of the first time period $t_1$ (e.g., a room where the lights have been turned off).

At sometime during the second time period $t_2$, the user of the user device 906 provides a user input 1008 at the user device 906 to adjust the brightness of the backlight 902. For example, the user input 1008 can instruct the backlight 902 to output light at a second backlight brightness level 1010. The second backlight brightness level 1010 can cause the display screen 904 to appear dark or dim as compared to the first backlight brightness level 1004 at time period $t_1$. In some examples, the backlight 110 is turned off when set to the second backlight brightness level 1010. Thus, in the example of FIG. 10, the brightness of the backlight 902 and, thus, the display screen 904, is reduced during the second time period $t_2$ as compared to the brightness of the backlight 902 during the first time period $t_1$.

At a third time period $t_3$, the user device 906 is in an environment associated with a third ambient light level 1012. In the example of FIG. 10, the third ambient light level 1012 is brighter than the second ambient light level 1006 of the environment of the second time period $t_2$. The third ambient light level 1012 can be the same or different than the first ambient light level 1002.

In the example of FIG. 10, the ambient light sensor(s) 910 of the user device 906 generate ambient light data indicative of the respective ambient light levels 1002, 1006, 1012 associated with each of the time periods $t_1$, $t_2$, $t_3$. In the example of FIG. 10, the backlight brightness manager 912 of FIG. 10 detects that the user provided the user input 1008 to adjust the brightness of the backlight 902. Based on the ambient light data, the example backlight brightness manager 912 determines that there has been a change in ambient light levels between the second time period $t_2$ and the third time period $t_3$. The example backlight brightness manager 912 calculates a difference between the second ambient light level 1006 and the third ambient light level 1012, as represented by a delta symbol 1014 in FIG. 10. For example, the backlight brightness manager 912 determines a difference in illuminance between the second and third ambient light levels 1006, 1012.

The example backlight brightness manager 912 determines if the difference between the second and third ambient light levels 1006, 1012 exceeds a predefined threshold indicative of a change in ambient light levels. The threshold can be based on, for instance, reference data indicative of ambient light levels and corresponding brightness levels to be output the backlight 902 to facilitate viewing of the display screen 904 at the different light levels (e.g., based on screen type, size, viewing angle, etc.).

If the difference between the second and third ambient light levels 1006, 1012 exceeds the threshold, the backlight brightness manager 912 determines that the user device 906 is no longer in a dark or dimly lit environment. Accordingly, the backlight brightness manager 912 generates instruction(s) for the backlight 110 to output light at a third backlight brightness level 1016. In the example of FIG. 10, the third backlight brightness level 1016 is brighter than the second (user-defined) backlight brightness level 1010. Thus, the backlight brightness manager 912 automatically adjusts the brightness level of the backlight 902 from the user-defined second backlight brightness level to facilitate viewing of the display screen 904. Thus, backlight brightness is dynamically adjusted based on the third ambient light level 1012 without the user manually adjusting the backlight 902 to increase the brightness in the brighter environment.

In some examples, the backlight brightness manager 912 determines the third backlight brightness level 1016 based on ambient light data collected by the ambient light sensor(s) 910 during the third time period $t_3$ (e.g., corresponding to a current ambient light level of the environment in which the user device 906 is located). In other examples, the third brightness level 1016 is based on a brightness level of the backlight 902 before the user manually adjusted the backlight brightness (e.g., the first backlight brightness level 1004).

If the backlight brightness manager 912 determines that the difference between the second and third ambient light levels 1006, 1012 does not exceed the threshold, the backlight brightness manager 912 generates instructions for the backlight 902 to continue to output light at the second, user-defined backlight brightness level 1010. In such examples, the change in ambient light levels between the second and third time periods $t_2$, $t_3$ does not affect the user's ability to view the display screen 904 when the backlight 902 is set to the user-defined second backlight brightness level 1010. As a result, the backlight brightness manager 912 instructs the backlight 902 to maintain the user-defined second backlight brightness level 1010 while the user device 906 is in the environment associated with the third ambient light level 1012. Thus, the example backlight brightness manager 912 selectively adjusts the brightness of the backlight 902 after a manual user adjustment to facilitate ease of viewing the display screen 904 after change in a light level of the environment(s) in which the user device 906 is located.

Figure 11:
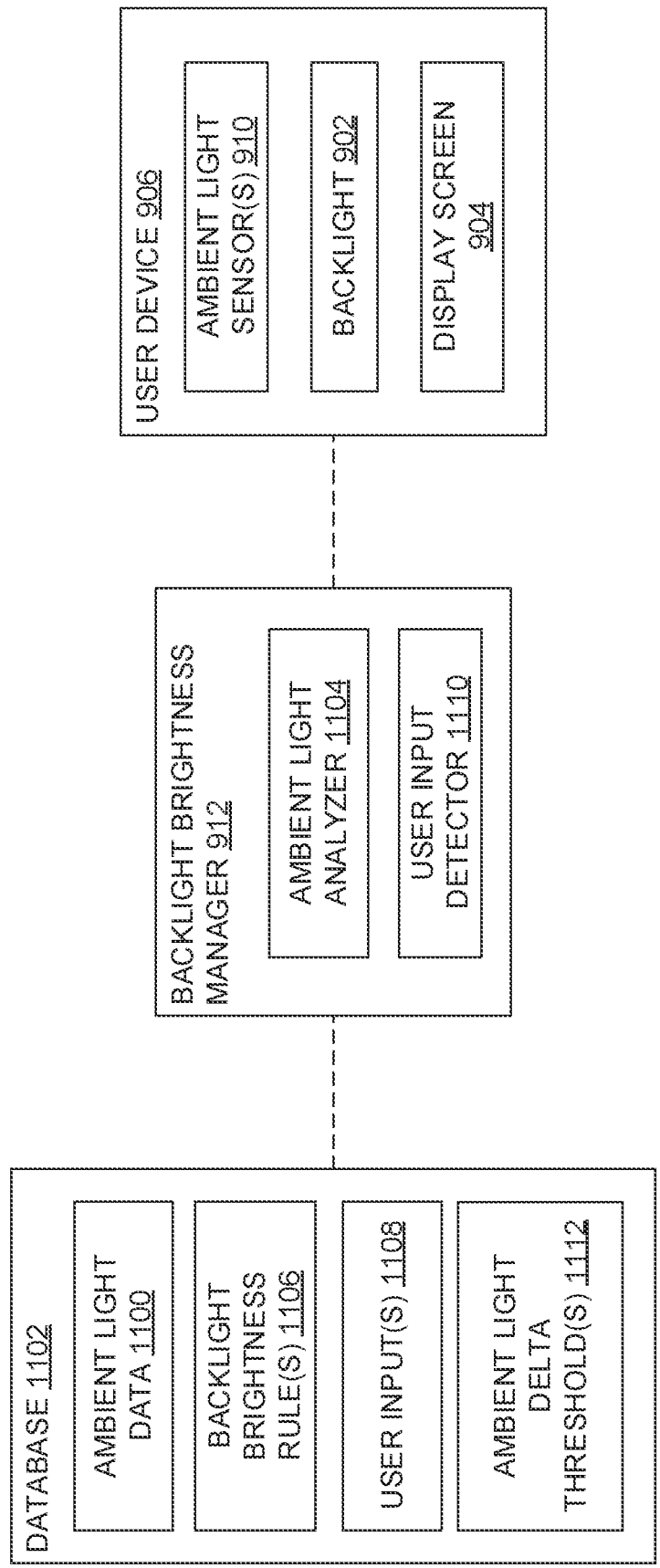
FIG. 11 is a block diagram of an example implementation of the backlight brightness manager of FIG. 9.

FIG. 11 is a block diagram of an example implementation of the backlight brightness manager 912 of FIG. 9. As mentioned above, the example backlight brightness manager 912 is constructed to manage brightness of a light output by a backlight (e.g., the backlight 902 of FIG. 9) associated with a display screen (e.g., the display screen 904 of FIG. 9) of a user device (e.g., the user device 906 of FIG. 9). In the example of FIG. 11, the backlight brightness manager 912 is implemented by one or more of the processor 908 of the user device 906 of FIG. 9, a processor of another user device, and/or cloud-based devices (e.g., server(s), processor(s), and/or virtual machine(s)).

The backlight brightness manager 912 receives ambient light data 1100 from the ambient light sensor(s) 910 of the user device 906. The ambient light data 1100 is indicative of an intensity of light in the surrounding environment in which the user device 906 is located. The example ambient light sensor(s) 910 can generate ambient light data 1100 substantially continuously, periodically, or aperiodically during operation of the user device 906.

The ambient light data 1100 is stored in a database 1102. In some examples, the backlight brightness manager 912 includes the database 1102. In other examples, the database 1102 is located external to the backlight brightness manager 912 in a location accessible to the backlight brightness manager 912 as shown in FIG. 11.

The example backlight brightness manager 912 of FIG. 11 includes an ambient light analyzer 1104. The ambient light analyzer 1104 analyzes the ambient light data 1100 to identify a light level in an environment in which the user device 906 is located. The ambient light analyzer 1104 generates instructions that define a brightness of the backlight 902 based on the ambient light data 1100 and one or more backlight brightness rules 1106. In the example of FIG. 11, the backlight brightness rule(s) 1106 are stored in the database 1102. The backlight brightness rule(s) 1106 define brightness settings for the backlight 902 based on ambient light level(s), screen type, display screen viewing angle, etc. The backlight brightness rule(s) 1106 can be provided via user input(s). The ambient light analyzer 1104 of FIG. 11 transmits the instructions to the backlight 902 via one or more wired or wireless connections.

As mentioned above, in some examples, a user of the user device 906 manually adjusts the brightness of the backlight 902 by providing one or more inputs at the user device 906 (e.g., via the display screen 904). In the example of FIG. 11, user inputs(s) 1108 indicative of manual user adjustments the brightness of the backlight 902 are stored in the database 1102. The user input(s) 1108 include the brightness level of the backlight 902 as set by the user. In some examples, the corresponding ambient light detected by the ambient light sensor(s) 910 when the user input was provided at the user device 906 is also stored in the database 1102.

The example backlight brightness manager 912 includes a user input detector 1110. The user input detector 1110 detects that the user has manually adjusted the brightness of the backlight 902 based on the detection of user input(s) 1108. In response to the user input(s) 1108, the user input detector 1110 instructs the ambient light analyzer 1104 to identify changes in the ambient light levels and to determine if the brightness of the backlight 902 should be automatically readjusted from the manual setting by the user.

For example, the ambient light analyzer 1104 compares ambient light data 1100 collected over time to detect changes in the ambient light data 1100. The ambient light analyzer 1104 compares ambient light data 1100 collected at a first time (e.g., at the second time period $t_2$ of FIG. 10) and a second time (e.g., at the third time period $t_3$ of FIG. 10). The example ambient light analyzer 1104 determines if the difference between the ambient light data 1100 collected at the first time period and the ambient light data 1100 collected at the second time period exceeds a predefined ambient light delta threshold 1112. The ambient light delta threshold(s) 1112 indicate changes in ambient light levels for which the brightness of the backlight 902 should be automatically adjusted relative to the brightness of the backlight 902 manually set by the user. The ambient light delta threshold(s) 1112 can be defined by user input(s) and stored in the database 1102.

If the example ambient light analyzer 1104 of FIG. 11 determines that the change in ambient light levels between the first and second time periods exceeds the ambient light delta threshold 1112, the ambient light analyzer 1104 generates instructions for the brightness of the backlight 902 to be automatically adjusted, thereby overriding the user input(s) 1108 that caused the backlight 902 to turn off or be dimmed. The automatic adjustments to the brightness of the backlight 902 enable the user to view the display screen 904 without having to provide further manual adjustments to the backlight 902. In the example of FIG. 11, the adjustment(s) to the backlight 902 are based on the backlight brightness rule(s) 1106. In some examples, the ambient light analyzer 1104 instructs the backlight 902 to adjust brightness based on the current light level as indicated by the ambient light data 1100. In some other examples, the ambient light analyzer 1104 instructs the backlight 902 to adjust brightness based on predefined user settings and/or previous backlight brightness level(s) (e.g., a brightness level of the backlight before the user manually adjusted the brightness level).

If the example ambient light analyzer 1104 of FIG. 11 determines that the change in ambient light levels between the first and second time periods does not exceed the ambient light delta threshold 1112, the ambient light analyzer 1104 instructs the backlight 902 to continue to output light at the user-defined brightness setting. In such examples, the backlight 902 continues to operate based on the manually received brightness setting until there is a change in ambient light levels that exceeds the ambient light delta threshold 1112. At such a time, the ambient light analyzer 1104 determines that the backlight brightness should be automatically adjusted to facilitate user viewing of the display screen 904.

While an example manner of implementing the backlight brightness manager 902 of FIGS. 9 and 10 is illustrated in FIG. 11, one or more of the elements, processes and/or devices illustrated in FIG. 11 may be combined, divided, re-arranged, omitted, eliminated and/or implemented in any other way. Further, the example database 1102, the example ambient light analyzer 1104, the example user input detector 1110, and/or, more generally, the example backlight brightness manager 902 of FIG. 11 may be implemented by hardware, software, firmware and/or any combination of hardware, software and/or firmware. Thus, for example, any of the example database 210, the example ambient light analyzer 1104, the example user input detector 1110, and/or, more generally, the example backlight brightness manager 902 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 210, the example ambient light analyzer 1104, and/or the example user input detector 1110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example backlight brightness manager 902 of FIG. 11 may include one or more elements, processes and/or devices in addition to, or instead of, those illustrated in FIG. 11, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
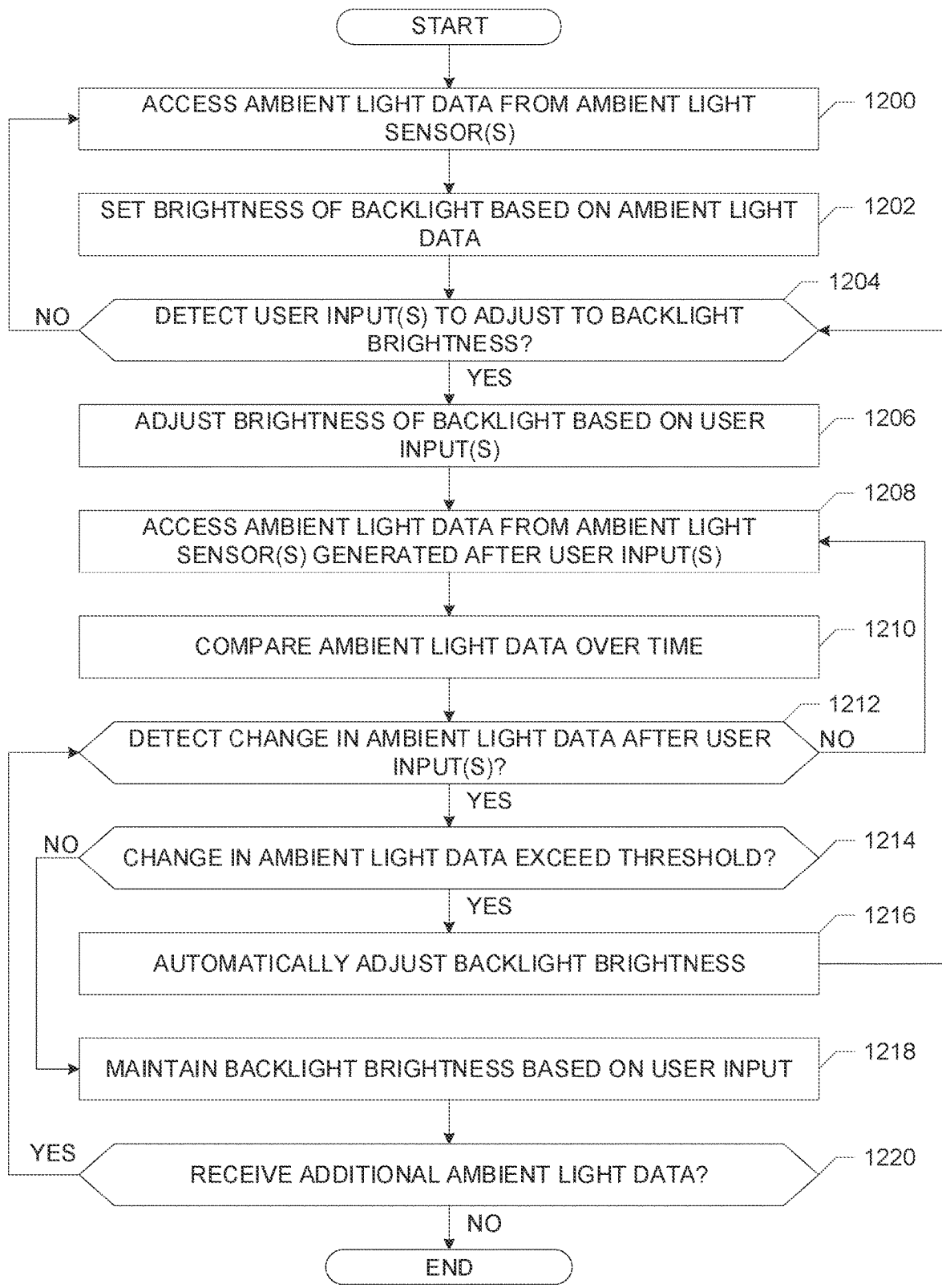
FIG. 12 is a flowchart representative of example machine readable instructions which may be executed to implement the example backlight brightness manager of FIGS. 9, 10 and/or 11.

A flowchart representative of example hardware logic, machine readable instructions, hardware implemented state machines, and/or any combination thereof for implementing the example backlight brightness manager 912 is shown in FIG. 12. The machine readable instructions may be an executable program or portion of an executable program for execution by a computer processor such as the processor 912 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor(s) 912 and/or embodied in firmware or dedicated hardware. Further, although the example program is described with reference to the flowchart illustrated in FIG. 12, many other methods of implementing the example backlight brightness manager 912 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 12 is a flowchart of example machine readable instructions that, when executed by a processor, implement the example backlight brightness manager 912 of FIGS. 9, 10 and/or 11. In the example of FIG. 12, the backlight brightness manager 912 generates instruction(s) to control the brightness of the backlight 902 of the display screen 904 of the user device 906 in response to changes in ambient light levels after a user has manually adjusted the backlight brightness. The example instructions of FIG. 12 can be executed by one or more processors of, for instance, the user device 906, another user device, and/or a cloud-based device. The instructions of FIG. 12 can be executed in substantially real-time as the ambient light sensor(s) 910 generate ambient light data/or as a user interacts with the user device 906.

The ambient light analyzer 1104 of the example backlight brightness manager 912 accesses ambient light data 1100 generated by the ambient light sensor(s) 910 of the user device 906 (block 1200). The ambient light analyzer 1104 sets the brightness of the backlight 902 of the user device 906 based on the ambient light data 1100 and the backlight brightness rule(s) 1106 (block 1202).

In the example of FIG. 12, if the user input detector 1110 detects a user input 1108 to adjust the brightness of the backlight 902 (block 1204), the ambient light analyzer 1104 generates instructions for the brightness of the backlight 902 to be adjusted based on the user input (block 1206).

In the example of FIG. 12, the ambient light analyzer 1104 access ambient light data 1100 generated by the ambient light sensor(s) 910 after the user input(s) 1108 are received (block 1208). The ambient light analyzer 1104 compares the ambient light data 1100 over time (e.g., between the second and third time periods $t_2$, $t_3$ of FIG. 10) (block 1210). In the example of FIG. 12, if the ambient light analyzer 1104 determines that the ambient light data 1100 indicates a change in ambient light levels for the environment in which the user device 906 is located (block 1212), the ambient light analyzer 1104 determines if the change exceeds an ambient light delta threshold 1112 (block 1214).

If the change in ambient light data exceeds the ambient light delta threshold 1112, the ambient light analyzer 1104 generates and transmits instructions to the backlight 902 to automatically adjust the backlight 902 to enable the user to view the display screen 904 (block 1216). In the example of FIG. 12, the ambient light analyzer 1104 can adjust the brightness of the backlight 902 based on ambient light data most recently collected by the ambient light sensor(s) 910, a previous backlight brightness level (e.g., a backlight brightness level at time prior to receipt of the user input), and/or a predefined user setting. In such examples, the ambient light analyzer 1104 continues to control the brightness of the backlight 902 until additional user input(s) 1108 including manual adjustments to the brightness level are received (block 1204).

If the change in ambient light data does not exceed the ambient light delta threshold 1112, the ambient light analyzer 1104 generates and transmits instructions to the backlight 902 to continue to output light at the brightness level defined by the user via the user input(s) 1108 (block 1218). The ambient light analyzer 1104 continues to analyze the ambient light data 1100 until no further data is received (block 1220).

Although the examples of FIGS. 9-12 are discussed in the context of managing brightness of a backlight of a display panel, teachings disclosed herein can be utilized in other applications. For example, audio data collected by audio sensor(s) (e.g., a microphone) can be analyzed to determine adjustments to volume of audio as a user listening to, for instance, audio via a music player device, moves between environments with different ambient noises. In such examples, the audio volume can be automatically adjusted (e.g., raised) when a user moves from a quiet environment to a noisy environment after the user has manually decreased the volume while in the quiet environment.

Figure 13:
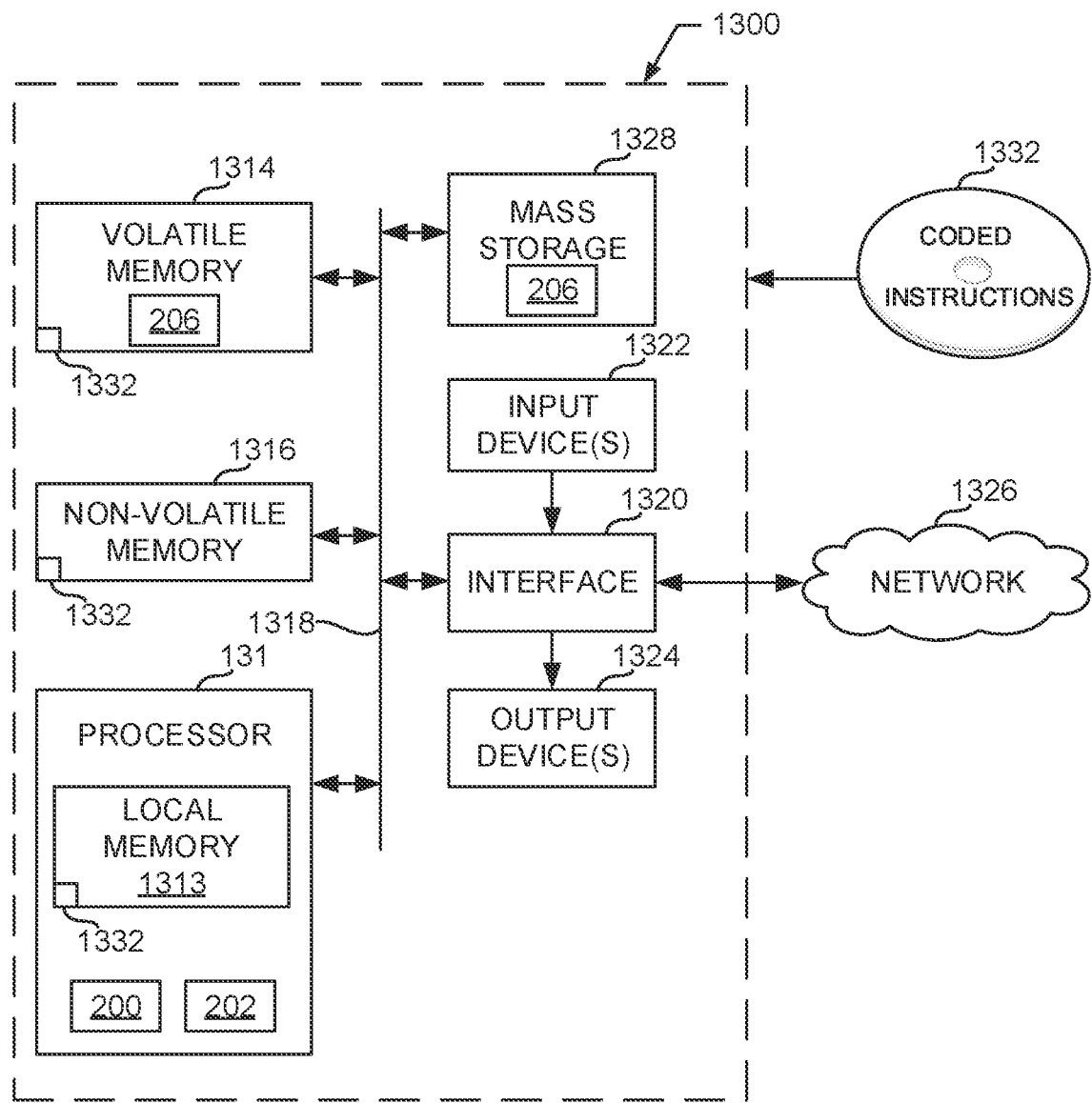
FIG. 13 is a block diagram of an example processing platform structured to execute the instructions of FIG. 7 to implement the example training manager of FIG. 2.

FIG. 13 is a block diagram of an example processor platform 1300 structured to execute the instructions of FIG. 7 to implement the example training manager 131 of FIGS. 1 and/or 2. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1300 of the illustrated example includes a processor 131. The processor 131 of the illustrated example is hardware. For example, the processor 131 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example trainer 200 and the example machine learning engine 202.

The processor 131 of the illustrated example includes a local memory 1313 (e.g., a cache). The processor 131 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 131. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 7 may be stored in the mass storage device 1328, in the volatile memory 1314, in the non-volatile memory 1316, and/or on a removable non-transitory computer readable storage medium such as a CD or DVD.

Figure 14:
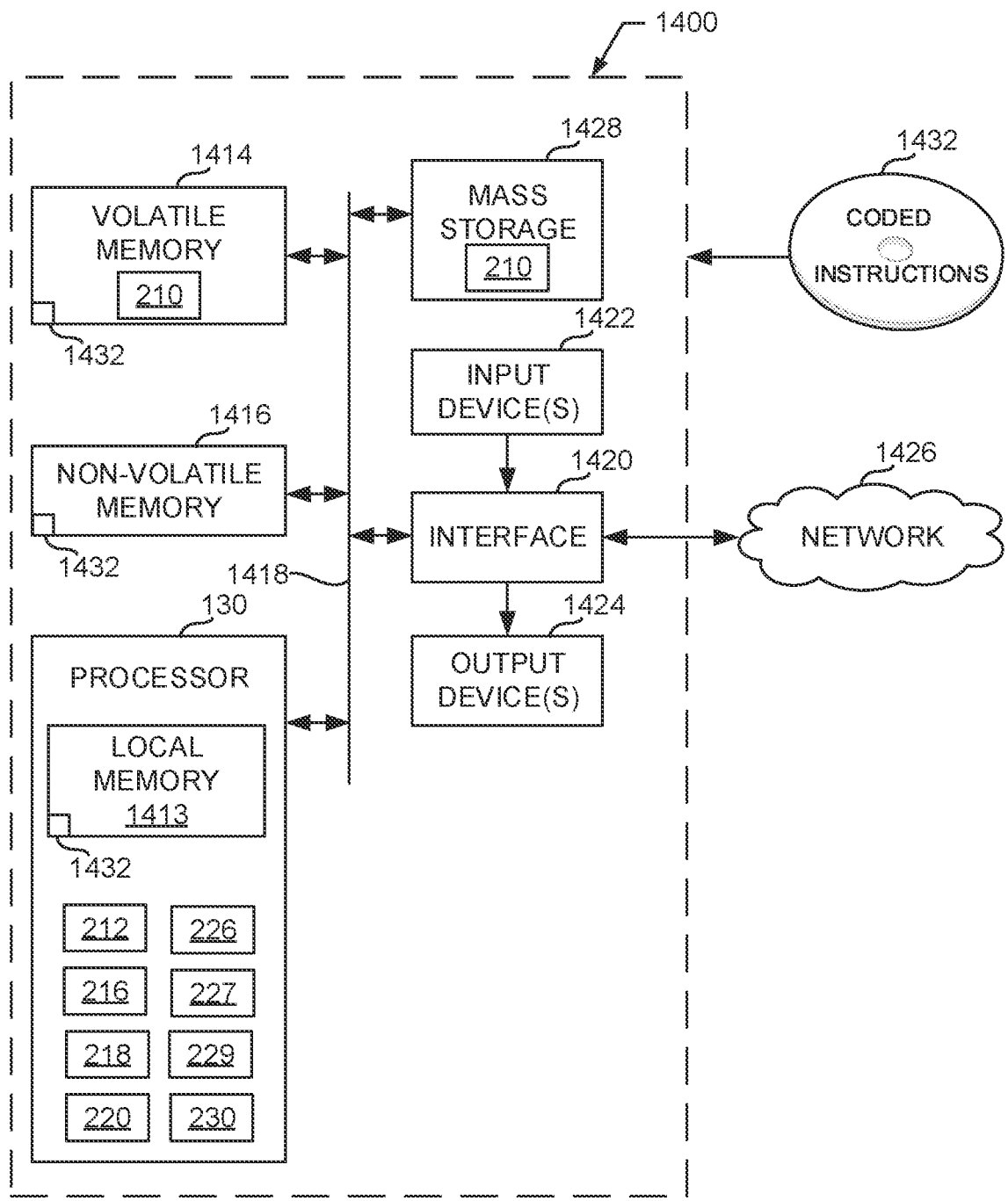
FIG. 14 is a block diagram of an example processing platform structured to execute the instructions of FIGS. 8A and 8B to implement the example display panel controller of FIG. 2.

FIG. 14 is a block diagram of an example processor platform 1400 structured to execute the instructions of FIGS. 8A and 8B to implement the example display panel controller 130 of FIGS. 1 and/or 2. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1400 of the illustrated example includes a processor 130. The processor 130 of the illustrated example is hardware. For example, the processor 130 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user presence detector 212, the example gaze detector 216, the example panel electronics manager 218, the example backlight manager 220, the example ambient light analyzer 226, the example feedback analyzer 227, the example user interaction detector 229, and the example application usage detector 230.

The processor 130 of the illustrated example includes a local memory 1413 (e.g., a cache). The processor 130 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 130. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIGS. 8A and 8B may be stored in the mass storage device 1428, in the volatile memory 1414, in the non-volatile memory 1416, and/or on a removable non-transitory computer readable storage medium such as a CD or DVD.

Figure 15:
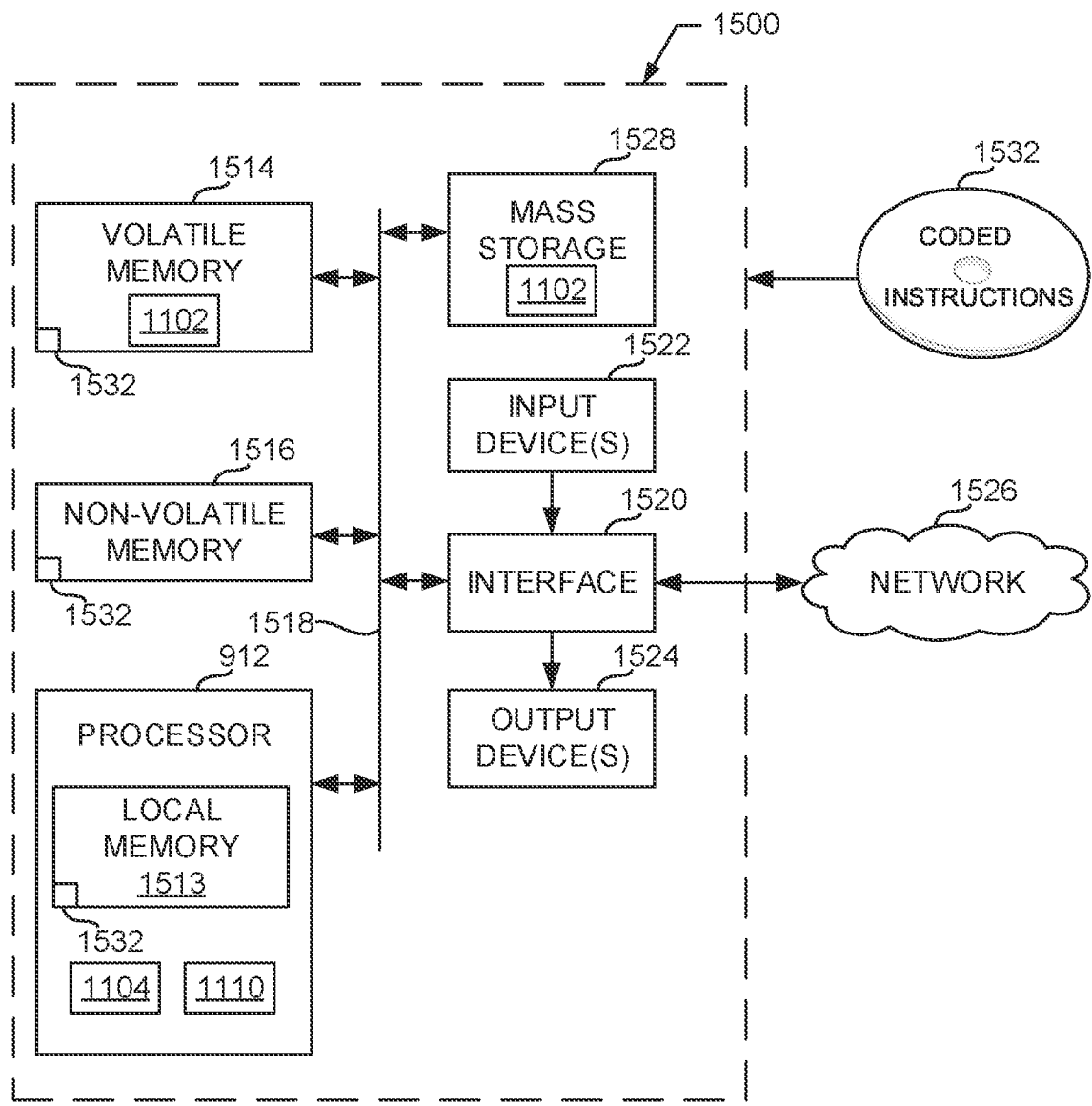
FIG. 15 is a block diagram of an example processing platform structured to execute the instructions of FIG. 12 to implement the example backlight brightness manager of FIG. 9.

FIG. 15 is a block diagram of an example processor platform 1500 structured to execute the instructions of FIG. 12 to implement the example backlight brightness manager 912 of FIGS. 9, 10, and/or 11. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1500 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example ambient light analyzer 1104 and the example user input detector 1110.

The processor 912 of the illustrated example includes a local memory 1513 (e.g., a cache). The processor 912 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIG. 12 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that provide for smart control of display devices to facilitate user ease in viewing a display screen and/or to manage power consumption based on user engagement with the device. Some examples disclosed herein control operation of the panel electronics and/or the backlight of a display panel based on user presence and attentiveness relative to the display screen, as detected using facial recognition analysis of image data. Examples disclosed herein dynamically adjust the display panel based detection of the user within a field of view of the image sensor(s) of the device and detection of the user's gaze relative to the device to maximum power savings while the device is an operative state and the user selectively interacts with the device. Some examples disclosed herein determine the brightness of the backlight of display based on ambient light data and automatically adjust the backlight brightness in view of manual adjustments by the user to the backlight brightness. Such examples provide of ease of viewing the display screen as the ambient light levels change without requiring further manual adjustments by the user.

Some disclosed methods, apparatus, and articles of manufacture improve the efficiency of a computing device by dynamically controlling operation of the display panel based on user presence and attention relative to the device. Some examples disclosed herein improve power conservation efforts by more accurately detecting user interactions with the device or periods or inactivity as compared to known examples that rely on predefined periods of inactivity before turning off the display panel. In performing the analysis of user interactions with the display device, examples disclosed herein conserve power by, for instance, collecting low resolution image data, refraining for analyzing the image data when the user is known to be interacting with the device, etc. As result, examples disclosed herein provide for improved power management of the device.

Some other disclosed methods, apparatus, and articles of manufacture improve the efficiency of a computing device by analyzing ambient light levels and determining whether the brightness of the backlight should be adjusted based on auto-brightness settings or whether the brightness should be maintained at a previous manual user-defined setting. Rather than requiring the user to reactivate the auto-brightness setting after turning the setting off, examples disclosed herein automatically determine the brightness setting based on ambient light data. The disclosed methods, apparatus and articles of manufacture are accordingly directed to one or more improvement(s) in the functioning of a computer.

Example 1 includes an apparatus to control a display of an electronic device. The apparatus includes a user presence detector to determine a presence of a user relative to the device based on image data generated by an image sensor of the electronic device, a gaze detector to determine a direction of a gaze of the user relative to the image sensor based on the image data, and a backlight manager to selectively adjust a display brightness based on the presence of the user and the direction of the gaze of the user.

Example 2 includes the apparatus as defined in example 1, further including a panel electronics manager to selectively control operation of panel electronics of the display based on the presence of the user.

Example 3 includes the apparatus as defined in example 1, wherein the user presence detector is to determine the presence of the user based on detection of a face in the image data.

Example 4 includes the apparatus as defined in example 1, wherein the gaze detector is to determine the direction of the gaze of the user based on detection of one or more features of a face of the user in the image data.

Example 5 includes the apparatus as defined in examples 1 or 2, further including a trainer to generate a face detection model based on the image data, the user presence detector to apply the face detection model to detect the presence of the user.

Example 6 includes the apparatus as defined in example 1, wherein the image data is first image data collected at a first time, the gaze detector to analyze second image data collected at a second time occurring after the first time to determine a direction of the gaze of the user at the second time and determine a change in the direction of the gaze of the user between the first time and the second time. The backlight manager is to adjust the display brightness based on the change in the direction of the gaze of the user.

Example 7 includes the apparatus as defined in example 6, wherein the backlight manager is to one of increase or decrease the display brightness on the change in the direction of the gaze of the user.

Example 8 includes the apparatus as defined in example 7, wherein a rate at which the backlight manager is to increase the display brightness is based on the direction of the gaze of the user at the first time.

Example 9 includes the apparatus as defined in examples 1 or 2, further including a user interaction detector to detect a user input at the device. The user presence detector is to refrain from analyzing the image data if the user interaction detector detects the user input.

Example 10 includes the apparatus as defined in examples 1 or 2, wherein the backlight manager is to further adjust the display brightness based on ambient light data generated by an ambient light sensor of the device.

Example 11 includes at least one non-transitory computer readable storage medium comprising instructions that, when executed, cause a machine to at least determine a direction of a gaze of a user relative to a user device based on image data generated by an image sensor of the user device and control operation of a display panel of the user device based on the direction of the gaze of the user.

Example 12 includes the at least one non-transitory computer readable storage medium as defined in example 11, wherein the instructions, when executed, further cause the machine to control operation of the display panel by adjusting a brightness of a backlight of the display panel.

Example 13 includes the at least one non-transitory computer readable storage medium as defined in example 11, wherein the instructions, when executed, further cause the machine to determine a presence or absence of the user relative to the user device based on the image data and to adjust a power state of panel electronics based on the presence or the absence of the user.

Example 14 includes the at least one non-transitory computer readable storage medium as defined in example 11, wherein the instructions, when executed, further cause the machine to determine the direction of the gaze of the user by identifying one or more facial features of the user in the image data.

Example 15 includes the at least one non-transitory computer readable storage medium as defined in example 11, wherein the image data is first image data generated at a first time and wherein the instructions, when executed, further cause the machine to detect a change in a direction the gaze of the user based on the first image data and second image data generated by the image sensor at a second time occurring after the first time and adjust a brightness of a backlight of the display panel based on the change in the direction of the gaze of the user.

Example 16 includes the at least one non-transitory computer readable storage medium as defined in example 15, wherein the instructions, when executed, further cause the machine to one of increase the brightness of the backlight, decrease the brightness of the backlight, or turn off the backlight based on the change in the direction of the gaze of the user.

Example 17 includes the at least one non-transitory computer readable storage medium as defined in example 11, wherein the instructions, when executed, further cause the machine to detect a user input received by the user device and refrain from determining the direction of the gaze of the user based on detection of the user input.

Example 18 includes the at least one non-transitory computer readable storage medium as defined in example 11, wherein the instructions, when executed, further cause the machine to apply a machine learning model to determine the direction of the gaze of the user.

Example 19 includes an electronic device having a display screen. The electronic device includes means for generating image data, means for illuminating the display screen, and means for adjusting a brightness of the means for illuminating. The means for adjusting is to determine a direction of a gaze of a user relative to the means for generating image data based on the image data and one of increase or decrease the brightness of the means for illuminating based on the direction of the gaze of the user.

Example 20 includes the electronic device as defined in example 19, wherein the means for generating image data includes a camera.

Example 21 includes the electronic device as defined in example 19, wherein the means for adjusting is to determine the direction of the gaze of the user based on detection of at least on facial feature in the image data.

Example 22 includes the electronic device as defined in example 19, wherein the means for adjusting is to one of increase or decrease the brightness over time based on the direction of the gaze of the user or a change in a direction of the gaze of the user.

Example 23 includes the electronic device as defined in example 19, further including means for generating ambient light data. The means for adjusting is to further adjust the brightness of the means for illuminating based on the ambient light data.

Example 24 includes an electronic device having a display panel. The electronic device includes an image sensor to generate image data based on a field of view of the image sensor and a display panel controller to selectively control a power state of at least one of a backlight and panel electronics of the display panel based on a presence of a user in the image data.

Example 25 includes the electronic device as defined in example 24, wherein the image sensor includes a camera.

Example 26 includes the electronic device as defined in example 24, wherein the display panel controller is to further adjust a brightness of a light output by the backlight based on a position of the user in the field of view.

Example 27 includes the electronic device as defined in example 24, further including an ambient light sensor to generate ambient light data associated with an environment in which the electronic device is located. The display panel controller is to further control the backlight based on the ambient light data.

Example 28 includes the electronic device as defined in example 24, wherein the display panel controller is to apply a face detection model to determine the presence of the user in the image data.

Example 29 includes the electronic device as defined in example 24, wherein the field of view is a first field of view and the display panel controller is to further determine a position of the user in a second field of view, the second field of view based on a viewing angle of a display screen of the display panel.

Example 30 includes an electronic device including an ambient light sensor to generate ambient light data indicative of a light level in an environment including the electronic device and a backlight to illuminate a display screen. The backlight to emit a light at a first brightness level, the first brightness level defined based on a user input. The electronic device includes a backlight brightness manager to instruct the backlight to one of maintain the first brightness level or emit light at a second brightness level based on the ambient light data, the second brightness level different from the first brightness level.

Example 31 includes the electronic device of example 30, wherein the ambient light data includes first ambient light data generated at a first time and second ambient light data generated at a second time occurring after the first time, backlight brightness manager to perform a comparison of the first ambient light data and the second ambient light data and to instruct the backlight based on the comparison.

Example 32 includes the electronic device of example 31, wherein the backlight brightness manager is to perform the comparison by determining a difference between the first ambient light data and the second ambient light data and perform a comparison of the difference between the first ambient light data and the second ambient light data to a threshold. The backlight brightness manager is to instruct the backlight to emit the light at the second brightness level if the difference exceeds the threshold.

Example 33 includes the electronic device of example 30, wherein the second brightness level is associated with an increase in a brightness of the light emitted by the backlight relative to the first brightness level.

Example 34 includes at least one non-transitory computer readable storage medium comprising instructions that, when executed, cause a machine to at least perform a comparison of first ambient light data generated by an ambient light sensor at a first time and second ambient light data generated by the ambient light sensor at a second time occurring after the first time and instruct a backlight to emit light at a first brightness level or a second brightness level based on the comparison. The second brightness level is different from the first brightness level. The first brightness level is defined based on a user input.

Example 35 includes the at least one non-transitory computer readable storage medium as defined in example 34, wherein the instructions, when executed further cause the machine to determine a difference between the first ambient light data and the second ambient light data, perform a comparison of the difference to a threshold and instruct the backlight to emit the light at the second brightness level if the difference exceeds the threshold.

Example 36 includes the at least one non-transitory computer readable storage medium as defined in example 35, wherein the instructions further cause the machine to instruct the backlight to emit light at the first brightness level if the difference does not exceed the threshold.

Example 37 includes the at least one non-transitory computer readable storage medium as defined in example 34, wherein the second brightness level is associated with an increase in a brightness of the light emitted by the backlight relative to the first brightness level.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An electronic device comprising:
    a display;
    machine-readable instructions; and
    processor circuitry to execute the machine-readable instructions to:
        identify a presence of a user relative to the electronic device based on image data generated by an image sensor of the electronic device;
        cause panel electronics of the display to transition from a first power state to a second power state responsive to the presence of the user relative to the electronic device;
        determine a position of the user relative the display based on the image data;
        cause an activation of a backlight of the display responsive to the position of the user relative to the display; and
        determine a direction of a gaze of the user relative to the image sensor based on the image data; and
        cause a brightness of the backlight to change at a first rate when the direction of the gaze of the user relative to the display is greater than a first angle and cause the brightness of the backlight to change at a second rate when the direction of the gaze of the user relative to the display is less than the first angle, the second rate slower than the first rate.

2. The electronic device as defined in claim 1, wherein the processor circuitry is to:
    identify the presence of the user relative to the electronic device at a first time;
    identify an absence of the user relative to the electronic device at a second time, the second time after the first time; and
    cause the panel electronics to transition from the second power state to the first power state based on the absence of the user.

3. The electronic device of claim 2, wherein the processor circuitry is to:
    identify a change in the position of the user relative to the display at a third time, the third time after the first time and before the second time; and
    cause a deactivation of the backlight based on the change in the position of the user relative to the display, the backlight to be deactivated prior to the panel electronics transitioning to the first power state.

4. The electronic device as defined in claim 1, wherein the processor circuitry is to identify the presence of the user based on detection of a face in the image data.

5. The electronic device as defined in claim 1, wherein the processor circuitry is to determine the direction of the gaze of the user based on detection of one or more features of a face of the user in the image data.

6. The electronic device as defined in claim 1, wherein the image data is first image data collected at a first time and the processor circuitry is to:
    analyze second image data collected at a second time occurring after the first time to determine the direction of the gaze of the user at the second time;
    determine a change in the direction of the gaze of the user between the first time and the second time; and
    cause adjustment of the brightness of the backlight based on the change in the direction of the gaze of the user.

7. The electronic device as defined in claim 6, wherein the processor circuitry is to cause the brightness of the backlight to one of increase or decrease based on the change in the direction of the gaze of the user.

8. The electronic device as defined in claim 1, wherein the processor circuitry is to further cause adjustment of the brightness of the backlight based on ambient light data generated by an ambient light sensor of the electronic device.

9. At least one non-transitory computer readable storage medium comprising instructions that, when executed, cause a machine to at least:

detect a presence of a user within a threshold distance of a display screen of a user device;
determine a direction of a gaze of the user relative to the user device based on image data generated by an image sensor of the user device;
determine a field of view of the user relative to the display screen based on the direction of the gaze; and
control a rate of change of a brightness of a backlight of a display panel of the user device based on the field of view of the user, the brightness of the backlight to change at a first rate when the direction of the gaze of the user defines a first field of view of the user and the brightness of the backlight to change at a second rate when the direction of the gaze defines a second field of view of the user, the second rate faster than the first rate.

10. The at least one non-transitory computer readable storage medium as defined in claim 9, wherein the instructions, when executed, further cause the machine to determine a presence or an absence of the user relative to the user device based on the image data and to adjust a power state of panel electronics of the display panel based on the presence or the absence of the user relative to the user device.

11. The at least one non-transitory computer readable storage medium as defined in claim 9, wherein the image data is first image data generated at a first time and wherein the instructions, when executed, further cause the machine to:
detect a change in the direction of the gaze of the user based on the first image data and second image data generated by the image sensor at a second time occurring after the first time; and
adjust the brightness of the backlight of the display panel based on the change in the direction of the gaze of the user.

12. The at least one non-transitory computer readable storage medium as defined in claim 11, wherein the instructions, when executed, further cause the machine to one of increase the brightness of the backlight, decrease the brightness of the backlight, or turn off the backlight based on the change in the direction of the gaze of the user.

13. The at least one non-transitory computer readable storage medium as defined in claim 9, wherein the change is one of an increase or a decrease in the brightness.

14. An electronic device having a display screen, the electronic device comprising:
means for generating image data;
means for illuminating the display screen; and
means for detecting a gaze of a user, the means for detecting to:
determine a position of the user relative to the display screen;
determine a direction of the gaze of the user based on the image data; and
means for adjusting a brightness of the means for illuminating, the means for adjusting to one of increase or decrease the brightness of the means for illuminating at (a) a first rate when an angle between the direction of the gaze of the user and the display screen is satisfies a first criterion and (b) a second rate when the angle between the direction of the gaze of the user and the display screen satisfies a second criterion different from the first criterion, the second rate faster than the first rate.

15. The electronic device as defined in claim 14, wherein the means for detecting is to determine the direction of the gaze of the user based on detection of at least one facial feature in the image data.

16. The electronic device as defined in claim 14, wherein the means for adjusting is to one of increase or decrease the brightness over time based on a change in whether the display screen is within a field of view of the user.

17. The electronic device as defined in claim 14, further including means for generating ambient light data, the means for adjusting to further adjust the brightness of the means for illuminating based on the ambient light data.

18. An electronic device comprising:
at least one memory;
machine-readable instructions; and
processor circuitry to execute the machine-readable instructions to:
detect a presence of a user relative to the electronic device based on image data generated by an image sensor of the electronic device;
cause panel electronics of a display of the electronic device to transition from a first power state to a second power state based on the presence of the user;
determine a direction of a gaze of the user relative to the image sensor based on the image data;
determine a field of view of the user relative to the display based on the direction of the gaze of the user; and
cause adjustment of a brightness of the display at a first rate if the display is outside the field of view and cause the adjustment of the brightness of the display at a second rate if the display is within the field of view, the second rate faster than the first rate.

19. The electronic device as defined in claim 18, wherein the processor circuitry is to detect the presence of the user based on detection of a face in the image data.

20. The electronic device as defined in claim 18, wherein the processor circuitry is to determine the direction of the gaze of the user based on detection of one or more features of a face of the user in the image data.

21. The electronic device as defined in claim 18, wherein the image data is first image data collected at a first time and the processor circuitry is to:
analyze second image data collected at a second time occurring after the first time to determine the direction of the gaze of the user at the second time;
determine a change in the direction of the gaze of the user between the first time and the second time; and
cause adjustment of the brightness of the display based on the change in the direction of the gaze of the user.

22. The electronic device as defined in claim 21, wherein the processor circuitry is to cause the brightness of the display to be one of increased or decreased based on the change in the direction of the gaze of the user.

23. The electronic device as defined in claim 18, wherein the processor circuitry is to cause adjustment of the brightness of the display based on ambient light data generated by an ambient light sensor of the electronic device.

24. The electronic device as defined in claim 18, wherein the adjustment is one of an increase or a decrease in the brightness.

* * * * *